United States Patent
Keefer

(10) Patent No.: US 7,553,568 B2
(45) Date of Patent: Jun. 30, 2009

(54) HIGH EFFICIENCY LOAD-FOLLOWING SOLID OXIDE FUEL CELL SYSTEMS

(75) Inventor: Bowie G. Keefer, Vancouver (CA)

(73) Assignee: Bowie Keefer, Vancouver, British Columbia (CA)

( * ) Notice: Subject to any disclaimer, the term of this patent is extended or adjusted under 35 U.S.C. 154(b) by 659 days.

(21) Appl. No.: 10/993,902

(22) Filed: Nov. 19, 2004

(65) Prior Publication Data
US 2005/0106429 A1    May 19, 2005

Related U.S. Application Data

(60) Provisional application No. 60/523,756, filed on Nov. 19, 2003.

(51) Int. Cl.
*H01M 8/00* (2006.01)
*H01M 8/04* (2006.01)
(52) U.S. Cl. .............................. 429/13; 429/17; 429/20; 429/25
(58) Field of Classification Search .................. 429/13, 429/17, 19, 25, 20, 24, 34
See application file for complete search history.

(56) References Cited

U.S. PATENT DOCUMENTS

2002/0142208 A1*  10/2002  Keefer et al. .................. 429/34

* cited by examiner

*Primary Examiner*—Raymond Alejandro
(74) *Attorney, Agent, or Firm*—Klarquist Sparkman, LLP

(57) ABSTRACT

Enhanced high temperature fuel cell systems, such as solid oxide fuel cell systems and molten carbonate fuel cell systems are disclosed. Embodiments of the disclosure include solid oxide and molten carbonate fuel cell systems incorporating gas separation apparati facilitating the recycle of hydrogen fuel from fuel cell anode exhaust for supply to the fuel cell anode inlet, such systems capable of improved power densities and efficiencies of operation. Further embodiments of the disclosure include solid oxide and molten carbonate fuel cell systems incorporating inventive combinations of anode materials conducive to combination with enriched hydrogen fuel. Other embodiments of the disclosure include gas separation apparati for providing enriched oxygen feed to the cathode inlet of solid oxide and molten carbonate fuel cells.

18 Claims, 8 Drawing Sheets

HIGH EFFICIENCY LOAD-FOLLOWING SOLID OXIDE FUEL CELL SYSTEMS

CROSS REFERENCE TO RELATED APPLICATION

This application claims the benefit of the earlier filing date of U.S. Provisional Application No. 60/523,756, filed on Nov. 19, 2003. The entire disclosure of provisional application No. 60/523,756 is considered to be part of the disclosure of the accompanying application and is incorporated herein by reference.

FIELD

This application is related to high temperature fuel cell systems, such as solid oxide fuel cell systems, particularly in combination with gas separation apparati, and QuestAir Technologies' related copending patent applications, including U.S. patent application Ser. No. 09/591,275, issued on Jun. 18, 2002, as U.S. Pat. No. 6,406,523; U.S. patent application Ser. No. 09/808,715, issued on Jul. 26, 2005, as U.S. Pat. No. 6,921,597; U.S. patent application Ser. No. 10/039,940, issued on Aug. 8, 2006, as U.S. Pat. No. 7,087,331; and U.S. patent application Ser. No. 10/352,361, issued on Aug. 29, 2006, as U.S. Pat. No. 7,097,925, the disclosures of which in their entirety are incorporated herein by reference.

BACKGROUND

Fuel cells provide an environmentally friendly source of electrical current. One type of high temperature fuel cell (HTFC) used for generating electrical power is the solid oxide fuel cell (SOFC). The SOFC includes an anode channel for receiving a flow of fuel gas, a cathode channel for receiving a flow of oxygen gas, and a solid electrolyte which is a ceramic membrane conductive to oxygen ions and separates the anode channel from the cathode channel. Oxygen in the cathode channel dissociates to oxygen ions, which cross the electrolyte to react with hydrogen in the anode channel to generate a flow of electrons. While hydrogen is a preferred fuel gas for efficient SOFC operation, the fuel gas may be a hydrocarbon which reacts in the anode channel either by direct oxidation or to generate hydrogen by steam reforming and water gas shift reactions. As hydrogen is consumed, carbon monoxide may be oxidized directly or may be shifted by steam to generate additional hydrogen. Carbon dioxide and water vapor are produced in the anode channel by oxidation of fuel components. Typical operating temperature of solid oxide fuel cells is about 500° to about 1000° C.

Another type of high temperature fuel cell used for generating electrical power, particularly envisaged for larger scale stationary power generation, is the molten carbonate fuel cell (MCFC). The MCFC includes an anode channel for receiving a flow of hydrogen gas (or a fuel gas which reacts in the anode channel to generate hydrogen by steam reforming and water gas shift reactions), a cathode channel for receiving a flow of oxygen gas, and a porous matrix containing a molten carbonate electrolyte which separates the anode channel from the cathode channel. Oxygen and carbon dioxide in the cathode channel react to form carbonate ions, which cross the electrolyte to react with hydrogen in the anode channel to generate a flow of electrons. As the hydrogen is consumed, carbon monoxide is shifted by steam to generate additional hydrogen. Carbon dioxide and water vapor are produced in the anode channel by oxidation of fuel components, and by reduction of carbonate ions from the electrolyte. Typical operating temperature of molten carbonate fuel cells is about 650° C.

For stationary power generation, hydrogen may be generated from natural gas by steam reforming or partial oxidation, and particularly by direct internal reforming within the anode channel, to produce "syngas" comprising a mixture of hydrogen, carbon monoxide, carbon dioxide, steam and some unreacted methane. As hydrogen is consumed in the fuel cell anode channel, much of the carbon monoxide reacts with steam by water gas shift to generate more hydrogen and more carbon dioxide. Other carbonaceous feedstocks (e.g. heavier hydrocarbons, coal, or biomass) may also be reacted with oxygen and steam to generate syngas by partial oxidation, gasification or autothermal reforming.

While the fuel cell may be operated on hydrogen or syngas that has been generated externally from a fossil fuel, efficient thermal integration between a high temperature fuel cell and an external fuel processing system may be difficult to achieve, since the fuel cell stack generates excess heat remote from the endothermic heat demand of fuel processing.

In order to achieve benefits of simplicity and better thermal integration, most SOFC developments for natural gas as the hydrocarbon fuel have contemplated internal reforming, in which the steam methane reforming reaction is conducted within the anode channel. A conventional SOFC anode material is nickel cermet with yttria stabilized zirconia (Ni-YSZ), which is an active catalyst for steam methane reforming. However, the nickel cermet is also catalytic for carbon deposition which must be avoided, typically by operating with a sufficiently high steam/carbon ratio with the adverse consequence that the excess steam degrades the SOFC voltage output. Under typical SOFC operating conditions, the steam reforming reaction will be substantially complete within about the first 20% of the anode channel, resulting in excessive cooling of that zone, which degrades performance and causes thermal stresses that may damage the SOFC stack. To ameliorate these problems, it is standard practice to include a pre-reformer which may achieve about 30% conversion of the steam reforming reaction upstream of the anode channel entrance. The pre-reformer also reduces the risk of carbon deposition within the anode, by accelerated reforming or methanation of the more reactive higher hydrocarbon components. The pre-reformer may be an externally heated steam reformer or an autothermal reformer based on partial oxidation.

Further simplification could be achieved if the hydrocarbon fuel could be oxidized directly within the SOFC anode channel, without addition of steam. Thus, Barnett et al (U.S. Pat. No. 6,214,485 B1) have used a nickel yttria doped ceria (Ni/YDC) cermet anode without carbon deposition on methane at temperatures below 800° C. Gorte et al (U.S. Patent Application Publication US 2001/0053471 A1) have used copper ceria over porous yttria stabilized zirconia cermets (Cu/CeO2/YSZ) to demonstrate operation on a range of hydrocarbon fuels without carbon deposition. H. Kim et al (J. Electrochem. Soc. 149, p. A247, 2002) used copper-nickel alloy ceria cermets for direct SOFC oxidation of methane.

While the above developments of advanced SOFC anode materials can enable direct oxidation of dry methane and some other hydrocarbons, the anode catalytic activity for hydrocarbons is much inferior to that for hydrogen. Hence, severe anode over-voltages for direct oxidation of hydrocarbons are typical, and higher performance (least activation polarization) would always be expected with hydrogen. It is noteworthy that activity of a Cu-ceria-YSZ cermet (R. Gorte et al, Adv. Mater. 2000, 12, p. 1465, 2000) increases in the order of methane<butane<hydrogen, indicating that the LPG components of natural gas should be oxidized more readily than methane, as expected owing to their greater reactivity than the more stable methane molecule.

The lower heat of combustion of a fuel usefully defines the energy (enthalpy change of the reaction) that may be generated by oxidizing that fuel. The electrochemical energy that can be generated by an ideal fuel cell is however the free energy change of the reaction, which is smaller than the enthalpy change. The difference between the enthalpy change and the free energy change is the product of the entropy change of the reaction multiplied by the absolute temperature. This difference widens at higher temperatures, so higher temperature fuel cells inherently convert a lower fraction of the fuel energy to electrical power at high efficiency, while a larger fraction of the fuel energy is available only as heat which must be converted to electrical power by a thermodynamic bottoming cycle (e.g. steam or gas turbine plant) at lower efficiency.

For both SOFCs and MCFCs, accumulation of reaction products (carbon dioxide and steam) on the fuel cell anode opposes the electrochemical reaction, so that the free energy is reduced. Higher partial pressure of oxygen over the cathode, and higher partial pressure of hydrogen over the anode, drive the reaction forward so that the free energy is increased. Unfortunately, the reaction depletes the oxygen in the cathode channel and depletes hydrogen in the anode channel while rapidly increasing the backpressure of carbon dioxide as a diluent in the anode channel. Hence the free energy change is reduced, directly reducing the cell voltage of the fuel stack. This degrades the electrical efficiency of the system, while increasing the heat that must be converted at already lower efficiency by the thermal bottoming cycle.

The free energy change is simply the product of the electromotive force ("E") of the cell and the charge transferred per mole by the reaction ("2F"), where the factor of two reflects the valency of the oxygen ion. The following Nernst relation for a SOFC expresses the above described sensitivity of the electromotive force (open circuit voltage, or Gibbs free energy expressed as electron-volts per electron) to the partial pressures of the electrochemical reactants in the anode and cathode channels, where the standard electromotive force ("Eo") is referred to all components at standard conditions and with water as vapor.

$$E = E_o - \frac{RT}{2F} \ln\left[\frac{P_{H2O(anode)}}{P_{H2(anode)} \cdot P_{O2(cathode)}^{0.5}}\right]$$

The open circuit voltage is elevated by a high ratio of hydrogen to steam over the anode and by increased partial pressure of oxygen over the cathode. At finite working current density, the operating voltage is determined by subtracting ohmic resistance losses, activation polarization and concentration polarization from the open circuit voltage.

SUMMARY

An object of the present invention is to provide MCFC or SOFC based generation systems which address some of the deficiencies of the prior art. A further object of the present invention is to provide MCFC or SOFC generation systems adapted to manipulate reactant concentrations for enhanced performance and economics, and MCFC systems more particularly adapted to efficiently transfer carbon dioxide from the anode to the cathode while enhancing electrical power output. Another object of the present invention is to provide MCFC and SOFC electrical generation systems adapted to enable selective generation of electrical power, and/or hydrogen fuel, and/or useable heat, allowing flexible operation of the generation system while incorporating means for mitigation of "greenhouse" gas and other environmentally deleterious gas emissions, and enhancing overall efficiency of operation to increase sustainability of fuel resource use.

The present invention addresses some of the inefficiencies of SOFC electrical current generation systems discussed above by taking into account the fact that anode activation polarization and the more important cathode activation polarization are reduced by elevated partial pressures of respectively hydrogen and oxygen and providing means for advantageously exploiting these principles of SOFC operation. According to the present invention, gas separation systems may be applied for manipulating partial pressures of reactants in the fuel cell, so as to achieve higher voltage E by elevating the partial pressure of hydrogen over the anode. Suitable such gas separation systems may include regenerable adsorbent systems which may be regenerated by sweep or displacement purge, cyclic pressure, or cyclic temperature means, as are described in detail in the Applicant's copending U.S. patent application Ser. No. 10/389,541, which issued on Jun. 17, 2008, as U.S. Pat. No. 7,387,849, the contents of which in its entirety are herein incorporated by reference.

More particularly, in one aspect the present invention applies to a SOFC system having an anode channel with an inlet and an outlet, and a cathode channel with an inlet and an outlet, the anode and cathode channels being separated by a solid electrolyte conductive to oxygen ions. The solid electrolyte is layered with electrode materials, on one side with an anode material contacting the anode channel, and on the opposite side with a cathode material contacting the cathode channel. The SOFC system has a first anode portion adjacent the anode inlet, and a second anode portion adjacent the anode outlet; and in general any number of intermediate anode portion(s) along the anode channel between the first and second anode portions.

The SOFC system may comprise a single SOFC stage, or it may comprise a plurality of stages (e.g. a "network") in series along the anode channel between the anode inlet and outlet. Each SOFC stage may have a single SOFC cell of tubular or planar or other configuration, or multiple cells receiving the anode and cathode flows in parallel while electrically connected in series. The SOFC cells may be segmented (e.g. in a segmented tubular configuration) so as to receive the anode and cathode flows in series, while also electrically connected in series. The first, second and any intermediate anode portions may be provided with two or more anode portions as zones of the anode of a single SOFC stage, or each anode portion may be the anode of a single SOFC stage or segment.

In a first aspect of the present invention, a SOFC system is operated cooperatively with a gas separation system in order to enrich hydrogen in the anode channel while discharging carbon dioxide. Thus, hydrogen may be recovered from the anode exhaust gas of a SOFC system by means of a gas separation system, where the recovered hydrogen may be enriched by at least partial removal of water vapour and carbon dioxide, and the said enriched hydrogen may be recycled to the anode inlet either directly or after processing in a fuel processing means which may include supplemental fuel. The anode exhaust gas received from the anode outlet may be subjected to water gas shift reaction, optionally with added steam, before separation of hydrogen to be recycled.

Alternatively, anode exhaust gas received from the anode outlet, at elevated temperature and containing fuel cell product steam, may be mixed directly with fresh incoming fuel and introduced to a fuel processing means, and then may desirably be subjected to water gas shift reaction at a less elevated temperature, before admission to a gas separator for separation of fuel gas enriched in hydrogen and methane to be admitted to the anode inlet after recuperative heating. Carbon dioxide may be removed by adsorption, and water vapour may be removed by condensation.

In certain embodiments, the fuel processing means mentioned above may be a prereformer for light hydrocarbon feeds or a hydrogasification reactor for heavier feedstocks such as biomass or coal. Recycle of enriched hydrogen passed through such fuel processing means may desirably assist conversion of higher hydrocarbons present in the fuel stream to methane, so that the SOFC may operate advantageously on a fuel mixture largely comprising hydrogen and methane.

The electromotive force along the anode channel may desirably be enhanced by enriched hydrogen recycle with direct internal reforming. Methane and CO are typically consumed by the internal reforming and water gas shift reactions as hydrogen is converted into steam, thus generating more hydrogen while consuming a fraction of the steam, so that the electromotive force obtained with a mixture of methane and recycled hydrogen fuel may unexpectedly be much higher than could be achieved with dry hydrogen (without any methane) as the fuel. The back-pressure of recycled hydrogen may act to delay the steam reforming reaction occurrence along the anode channel which may improve the heat load distribution along the anode channel.

While increasing the electromotive force, hydrogen recycle also may also enable operation of the SOFC system according to the present invention with desirably higher electrochemical fuel utilization. Typical fuel utilization of internal reforming SOFC is about 85%, to avoid steep decline of the electromotive force with the rising ratio of steam to hydrogen. Fuel utilization of 95% or more may readily be achieved in the present invention.

In a second aspect of the present invention which may be realized in combination with the first aspect of enriched hydrogen recycle, the fuel cell stack may be thermally insulated to minimize heat leakage, and high effectiveness recuperative heat exchangers or regenerators may be used to transfer heat from cathode exhaust gas to cathode inlet gas, and from anode exhaust gas to anode inlet gas. Blowers, vacuum pumps and other fluid circulation devices (e.g. mechanical compression loads) of the fuel cell power plant may in this aspect of the invention be desirably powered at least in part by a portion of the electrical power generated by the fuel cell. At a normal steady state operating condition of the fuel cell power plant in this aspect of the invention, the quantity of heat generated within the fuel cell stack may desirably be just sufficient to provide the heat required for endothermic reforming of the fuel, and to make up heat lost to heat leakage and imperfect effectiveness of the recuperative heat exchangers, such that the SOFC system according to the present invention may avoid the generation of large amounts of high grade waste heat energy.

The following discussion applies to relatively large SOFC power plants (e.g. at least about 50 kW) for which energy losses from heat leakage and compression inefficiencies can be reasonably minimized by careful design according to the art. By operating at the highest cell voltage at which the SOFC remains thermally self-sustaining, highest possible overall efficiency may be attained at this thermally balanced operating point. It is found that the gross power output of the fuel cell stack may be augmented so greatly by hydrogen recycle, that the net electrical power output of the fuel cell power plant after deducting the mechanical gas compression loads is still enhanced relative to the same fuel cell stack operated without hydrogen recycle. Unexpectedly, the SOFC with hydrogen recycle according to an aspect of the present invention, may achieve a favourable power density (in the order of 40% to 60% of maximum possible power density) and high efficiency (about 70% based on lower heating value of natural gas) at its thermally balanced operating point at which external cooling is not required.

This contrasts with the conventional SOFC without hydrogen recycle, which typically achieves much lower electrical generation efficiency and must be externally cooled (e.g. by circulation of excess air through the cathode channels). It is quite impracticable for the design operating point of a conventional SOFC to be at such high cell voltage, or for a large conventional SOFC to operate without external cooling, as the SOFC stack power output would be far too low (e.g. about 15% of maximum power output). It is well known that the excess heat of the conventional SOFC or MCFC can be recovered by an auxiliary gas turbine in hybrid power plants which can achieve about 65% efficiency. However, such hybrid power plants are operationally problematic, as the gas turbine is typically only properly matched in a narrow operating range. Hence, the hybrid power plant has poor transient response and limited load-following capability.

In a third aspect of the invention, which may be realized in combination with the first and second aspects, the mechanical compression loads may be provided with wide range variable flow capability. Preferably, the compression machines (feed air blower, VPSA vacuum pump, etc) may be provided as positive displacement machines with variable speed drives. Examples of suitable positive displacement compression machines may include rotary lobe blowers for the air feed, and rotary screw or scroll or claw vacuum pumps for a VPSA hydrogen enrichment system. Alternatively, radial or axial turbomachinery may be used as variable flow compressors or vacuum pumps, with the flow variation established by shaft speed variation and/or adjustment of internal blade or vane angles, and with the controls of such flow variation operated so as to maintain a desired working pressure differential across each turbomachine corresponding to its desired gas flow at each operating condition of the SOFC power plant. While the working pressure differential might be held relatively constant for a relatively narrow variable flow range, an relatively wide variable flow range may best be achieved with turbomachinery by operation with a relatively low working pressure differential at minimum flow, and a relatively high working pressure differential at maximum flow in the desired operating range. The hydrogen separation system may preferably be provided as a rotary adsorber module, which may also be driven by a variable speed motor which may be an electric motor, hydraulic motor, pneumatic motor, or gas expander using speed variation controls known in the art.

The third aspect of the present invention may enable the fuel cell power plant to deliver peak power to about double the normal operating power at the thermally balanced operating point, with all of the variable speed drives on the compression loads the rotary adsorber module operated at higher speed to match higher fuel cell current output. Under peak power conditions, the SOFC stack will operate at lower voltage efficiency due to ohmic and other polarization losses, and consequently will generate excess heat. Higher working pressure differentials (compression and vacuum as applicable) at higher power output would somewhat enhance SOFC efficiency at the higher current level so as to reduce the excess heat output from the SOFC stack. Necessary enhanced cooling for longer duration peak power delivery can be provided most effectively by disproportionately increasing the air flow to a greater stoichiometric ratio. The air flow may be regulated at least in part by a temperature sensor in the SOFC stack, so as to maintain the stack temperature in the desired operating temperature range.

In a further extension of the third aspect, the fuel cell power plant may be turned down to less than normal rated power output by slowing the variable speed drives in response to reduced fuel cell current output. Compressor and vacuum pump working pressure differentials may also be reduced at the lower flow regime corresponding to reduced power output. Thermal balance can be maintained by (1) disproportionately reducing hydrogen recycle and the fuel utilization ratio at lower power levels, and (2) directing at least some of the anode tail gas to an auxiliary burner which provides supplementary heat to the fuel cell stack as needed to maintain desired operating temperature. This auxiliary burner may also be used to warm up the stack during the power plant start-up procedure.

As the fuel cell stack temperature could be maintained approximately constant over a wide range of operating conditions from normal rated power output, both upward to peak power output and downward to a standby idling mode, load-following capability and transient response would be excellent. High efficiency may be realized across the operating range.

The above features will be very attractive in applications for distributed power generation and vehicle traction, particularly for military users who would appreciate the ability to substantially eliminate thermal signature of an internally high temperature power plant operating at thermally balanced conditions so that no high grade waste heat is emitted.

In a fifth aspect of the invention, energy storage means may be provided to provide early power availability during the start-up procedure, and also to provide further improvement of load-following and transient responsiveness. Such energy storage means may be provided at least in part as a battery bank. Alternatively, a hydrogen enrichment VPSA may be operated to deliver at least some of its product hydrogen at high purity, so that a portion of hydrogen generated by internal reforming within the SOFC or MCFC stack may be delivered by a suitable compressor to a hydrogen storage system. A metal hydride system may be preferred for storage of relatively small inventories of hydrogen generated at low pressure. Stored hydrogen may then be delivered to a PEM fuel cell to meet initial power demands while the SOFC or MCFC is warming up during the start-up procedure, and subsequently to contribute to peak power demands and transient response as needed. Some energy storage to smooth transient response is inherently provided by the inventory of excess enriched hydrogen circulating within the anode loop of the SOFC apparatus according to the invention.

In a sixth aspect of the invention, which may be applied with or without the preceding aspects, distinct anode materials may be used for at least first and second portions of the fuel cell anode in an SOFC system according to the present invention. In the first anode portion, the anode material may be selected to be non-catalytic to carbon deposition, preferably in the absence or near absence of water vapour. The object is to achieve safety against carbon deposition, while avoiding the conventional need for excess steam at the inlet that would penalize the electromotive force. In the second anode portion, the anode material may be selected to be more actively catalytic to steam reforming that would use SOFC reaction product steam from the first anode portion to generate hydrogen from methane and other hydrocarbon components.

Consequently, an exceptionally high hydrogen/steam ratio may be maintained in both first and second anode portions, particularly with enriched hydrogen recycle according to the first aspect of the invention. This will enhance power delivery at the thermally balanced operating point of the second aspect of the invention.

Suitable anode materials for the first anode portion include materials which are effective for direct oxidation of dry hydrocarbons without carbon deposition, with potentially suitable materials including but not limited to $Cu/CeO2/YSZ$, $Cu$-$GDC$, $Cu/Bi_2O_3$, $(La,Sr)(Ti,Ce)O_3$, and mixtures thereof. Suitable anode materials for the second anode portion include those which are active for steam reforming of hydrocarbons, for example $Ni/YSZ$, $Ni/YDC$, or $Ni$-$GDC$. Suitable anode materials for intermediate anode portions may be resistant to carbon deposition in the presence of modest steam concentrations, and may be moderately active for steam reforming, and may include for example $Cu$-$Ni/CeO2/YSZ$, $Cu$-$Ni/GDC$, modified $LaCrO_3$, or $(La,Sr)(Ti,Ce)O_3$. Intermediate between the first and second anode portions, the anode materials may be graded discretely or continuously between materials more effective for direct oxidation and those more active for steam reforming, so that the steam concentration may be as low as possible at the anode inlet and steam reforming of the fuel may be achieved with rising steam concentrations toward the anode outlet, with carbon deposition avoided on all anode portions. In a particular embodiment of this sixth aspect of the invention, the steam/carbon ratio may be desirably maintained at or below about 1.5 and particularly below about 0.5 at the anode inlet during normal operation of the fuel cell. By contrast, in internal reforming fuel cell systems of the prior art, substantially higher (such as steam carbon ratio of about 3 for example) concentrations of steam are typically used in order to avoid carbon deposition with conventional anode materials, in systems without the benefit of enriched hydrogen recycle.

The second anode portion and any intermediate anode portions may alternatively use the same or a similar anode material as used in the first anode portion, but with a steam reforming catalyst adjacent the anode material and contacting the anode channel in the second anode portion. Intermediate between the first and second anode portions, the steam reforming catalyst loading and/or activity may be graded discreetly or continuously so that steam reforming of the fuel may be performed with rising steam concentrations toward the anode outlet, with carbon deposition avoided on all anode portions. In a further alternative, a single material which is at least moderately resistant to carbon deposition and also at least moderately active for steam reforming may be used for both the first and second anode portions. Furthermore, the first, second and any intermediate anode portions may be electrically staged in series, so that each anode portion may operate as its own cell voltage matching the current through the corresponding cell area of that anode portion, with the cell area for each anode portion being selected so as to increase voltage efficiency and thus reduce heat generation in that anode portion so that the entire SOFC stack may be thermally balanced and highly efficient.

The principles of the combined first and sixth aspects of the invention are that (1) steam concentration is low while hydrogen concentration is elevated over the first portion of the anode so as to minimize polarization voltage losses and maximize voltage efficiency in the first anode portion, (2) the rising steam concentration with hydrogen oxidation along the anode channel provides an adequate steam/carbon ratio for steam reforming over the second anode portion, and (3) catalytic activity for steam reforming and the availability of steam are delayed until the latter portion of the anode channel, so as to achieve an improved thermal balance, reduced thermal stresses, and greater efficiency. Hydrogen concentration is boosted throughout the anode channel so that hydrogen will preferentially be consumed as the principal component undergoing anodic oxidation in both the first and second portions of the anode, while the elevated concentration of hydrogen also opposes carbon deposition by hydrocarbon cracking reactions. To the extent that direct oxidation of hydrocarbons also takes place while hydrogen is oxidized preferentially over the first anode portion, LPG hydrocarbon components would be oxidized more rapidly than methane to minimize their contribution to downstream carbon deposition risks. While direct oxidation of hydrocarbons only takes place to a minor degree in the present invention, the use of anode materials suitable for direct oxidation of dry hydrogen allows the circulation of dry or nearly dry hydrocarbons with hydrogen being oxidized over the first anode portion, for greater voltage efficiency and power density. In a particular embodiment of the combined first and sixth aspects of the present invention and using an anode material at the anode inlet that is resistant to carbon deposition at low steam levels, the highly hydrogen-enriched fuel mixture admitted to the anode inlet may desirably define a steam to carbon ration of no more than about 1.5, and more preferably less than about 0.5.

Aspects of the present invention may thus exploit the carbon deposition resistance of so-called "direct oxidation" anode materials, while largely or entirely avoiding the less efficient direct oxidation of hydrocarbon fuels in favour of oxidation of recycled hydrogen. As more reactive higher hydrocarbons will be preferentially oxidized relative to methane, the present invention may to some degree exploit the direct oxidation feature to consume a portion of the higher hydrocarbons preferentially upstream of the anode portion(s) active for steam reforming, so that carbon deposition is safely avoided even at low steam/carbon ratios, such as when the ratio of steam to carbon is no more than about 1.5.

The present invention recognizes that anode materials resistant to carbon deposition will typically have much lower activation polarization losses when hydrogen is a major fraction of the fuel stream, as compared to a fuel stream comprising hydrocarbons without free hydrogen. By separating water vapour and carbon dioxide from the anode exhaust stream using gas separation means, and recycling enriched hydrogen to the anode inlet, hydrogen is the main fuel consumed at the anode. Reforming of the hydrocarbon fuel to generate hydrogen takes place in the second anode portion using steam generated as the anode reaction product in the first anode portion, and may also take place upstream of the anode inlet in a pre-reformer and/or downstream of the anode outlet in an optional post-reformer. After cooling from the anode outlet, the anode exhaust gas may be contacted with a catalyst active for the water gas shift reaction, before the at least partial separation of water vapour and carbon dioxide after which recovered hydrogen is recycled to the anode inlet. Carbon dioxide separation may alternatively be conducted in conjunction with the water gas shift reaction.

In a seventh aspect of the invention, which may be applied in conjunction with the preceding aspects of the invention, the cathode inlet of the SOFC cathode channel may be supplied with enriched oxygen instead of air. Such enriched oxygen may be supplied by any source known in the art, including adsorption based oxygen concentration devices and systems, such as are disclosed in the Applicant's copending patent applications noted and incorporated by reference above. Enriched oxygen may be generated by VPSA using a rotary adsorber with a variable speed drive, and with the VPSA feed air blower and exhaust vacuum pump both provided with variable flow control (e.g. by variable speed drives), thus combining the seventh aspect of the invention with the second and third aspects of the invention.

With enriched oxygen feed to the cathode, the oxygen utilization in the cathode channel may be in the range of about 65% to about 90%. The remaining oxygen in the cathode exhaust gas may be delivered from the cathode outlet at elevated temperature, and is still greatly enriched in oxygen relative to air. Some or all of the cathode exhaust gas may be mixed with preheated hydrocarbon fuel gas (or vapour if the hydrocarbon is a liquid fuel) and may be reacted with the fuel in a catalytic partial oxidation step. Such a catalytic partial oxidation step may consume all the oxygen and convert a portion of the hydrocarbon fuel to syngas. After this step, the fuel is admitted to the SOFC anode inlet. If the oxygen utilization in the fuel cell cathode channel is in the range of about 65% to 70%, substantially complete conversion of a hydrocarbon to syngas may be achieved in the catalytic partial oxidation step. If the oxygen utilization in the fuel cell cathode channel is much higher, e.g. in the range of about 80% to 90%, only partial conversion of a hydrocarbon fuel would likely be achieved in the catalytic partial oxidation step, which is thus a pre-reforming step. The pre-reforming step may usefully convert higher hydrocarbons to syngas and/or methane, as internal reforming of methane within the SOFC anode channel is less sensitive to carbon deposition.

In one version of the seventh aspect of the invention, hydrogen recovered from the anode exhaust gas according to the first aspect of the invention may be mixed with the fuel gas either before or after the catalytic partial oxidation step. In another variation, a fraction of the anode exhaust gas containing water vapour and carbon dioxide may be recycled and mixed with the fuel before the catalytic partial oxidation step. Alternatively, steam may be injected into the fuel before the catalytic partial oxidation step, which with steam addition may be described as an autothermal reforming step. It is preferred that a minimal amount of steam be added as may be required to suppress carbon deposition, so as to avoid an excessive drop of SOFC voltage efficiency.

In a version of the seventh aspect of the invention, the fuel flow in the anode channel may be counter-current to the oxidant flow in the cathode channel, so that the cathode outlet is adjacent to the anode inlet. The catalytic partial oxidation or autothermal reforming reaction zone is at the anode inlet. The cathode exhaust gas may thereby mix with fuel gas or vapour entering the catalytic partial oxidation reaction zone.

Since the cathode exhaust is consumed adjacent the anode inlet, sealing of the SOFC is greatly simplified in the above version of the seventh aspect of the invention. Simple sealing geometries of those prior art SOFC devices which combine the anode exhaust gas and cathode exhaust gas in an exhaust combustor may be applied in the present invention in its seventh aspect. The first aspect of the invention (hydrogen separation and recycle from anode exhaust gas) requires that sealing means be provided so that at least a portion of the anode exhaust gas not be mixed with the cathode gas. The seventh aspect of the invention allows the first aspect to be implemented with the simplest possible SOFC stack sealing. Thus, the first, sixth and seventh aspects may be advantageously implemented in combination.

Hydrogen may also be generated by reacting a hydrocarbon fuel with steam and/or oxygen, and water gas shifting to maximize concentrations of hydrogen and carbon dioxide in the resulting syngas mixture. In a particular embodiment of the third aspect, desirably enriched oxygen for autothermal reforming (ATR) or partial oxidation (POX) syngas generation processes may be generated by VPSA, whose exhaust stream is nitrogen-enriched air withdrawn under vacuum. The syngas may be provided as the feed or first gas mixture to the VPSA, preferably after condensation water knock-out. The nitrogen-enriched exhaust of the oxygen VPSA unit may be used as the displacement purge, at its vacuum pressure. Thus, the first pressure may be established by the oxygen delivery pressure to the ATR or POX process with allowance for pressure drops through the reactors, while the second pressure may be established by a vacuum pump which withdraws the second gas mixture including both CO2 rejected from hydrogen enrichment and nitrogen rejected from air separation. The enriched hydrogen stream may then be subjected to further purification steps to remove residual carbon monoxide and other impurities, prior to introduction to the fuel cell anode inlet.

An embodiment of the enhanced fuel cell systems according to the present invention includes a gas separation device or system for separating hydrogen enriched fuel gas from the reaction product of carbon dioxide, so that hydrogen and optionally other fuel components may be recycled to the anode, while the carbon dioxide is either discharged to atmosphere or delivered as a concentrated product of the process. In the case of a MCFC, at least a portion of the carbon dioxide may be concentrated and may be recycled to the MCFC cathode inlet. Such a gas separation device may use alternative separation principles such as membrane permeation or physical or chemical absorption for removal of carbon dioxide from the recycle hydrogen stream, or may be based on adsorptive separation. Several such regenerable adsorptive gas separation devices and systems suitable for separating hydrogen and/or carbon dioxide in the embodiments of the present invention, are disclosed in detail in the Applicant's copending U.S. patent application Ser. No. 10/389,539 entitled "Gas Separation by Combined Pressure Swing and Displacement Purge", which issued on Jun. 17, 2008, as U.S. Pat. No. 7,387,849, the contents of which in its entirety are herein incorporated by reference.

The above reference also discloses in detail suitable processes for use in conjunction with such adsorptive gas separation devices in the fuel cell systems of the present invention. Several fuel cell system arrangements based on both SOFCs and MCFCs to which any combination of the previously mentioned first, sixth and seventh aspects of the present invention may be applied to form embodiments of the present inventive fuel cell systems are disclosed in the Applicant's copending U.S. patent application No. 60/451,057 entitled "Hydrogen Recycle for High Temperature Fuel Cells," published on Oct. 7, 2004, as U.S. 2004/0197612, the contents of which in their entirety are herein incorporated by reference.

In an eighth aspect of the present invention, embodiments of the inventive SOFC and MCFC systems incorporating improved gas separation processes and apparatus, and/or energy recovery means directed to improving the energy efficiency of the systems are disclosed. Such improved gas separation processes and apparatus may include improved adsorptive separation processes such as multi-stage pressure swing adsorption, and/or improved adsorptive separation apparatus such as staged rotary adsorber modules. Such energy recovery means may recover thermal, mechanical, pressure or other form of energy from the system, in order to improve efficiency and may include such exemplary energy recovery means as gas turbines, expanders, gas ejectors, and heat exchangers. Additionally, some embodiments according to the eighth aspect may include alternative hydrogen recycle means other than external enrichment by gas separation, either alone, or in combination with other hydrogen recycle means disclosed above. Such alternative means may include for example the use of an ejector pump to provide an internal recycle of at least a portion of anode exhaust gases to the anode inlet.

The foregoing features and advantages will become more apparent from the following detailed description of several exemplary embodiments that proceeds with reference to the accompanying figures.

BRIEF DESCRIPTION OF THE DRAWINGS

Certain embodiments are described below with reference to the following figures.

DETAILED DESCRIPTION OF SEVERAL EMBODIMENTS

Figure 1:
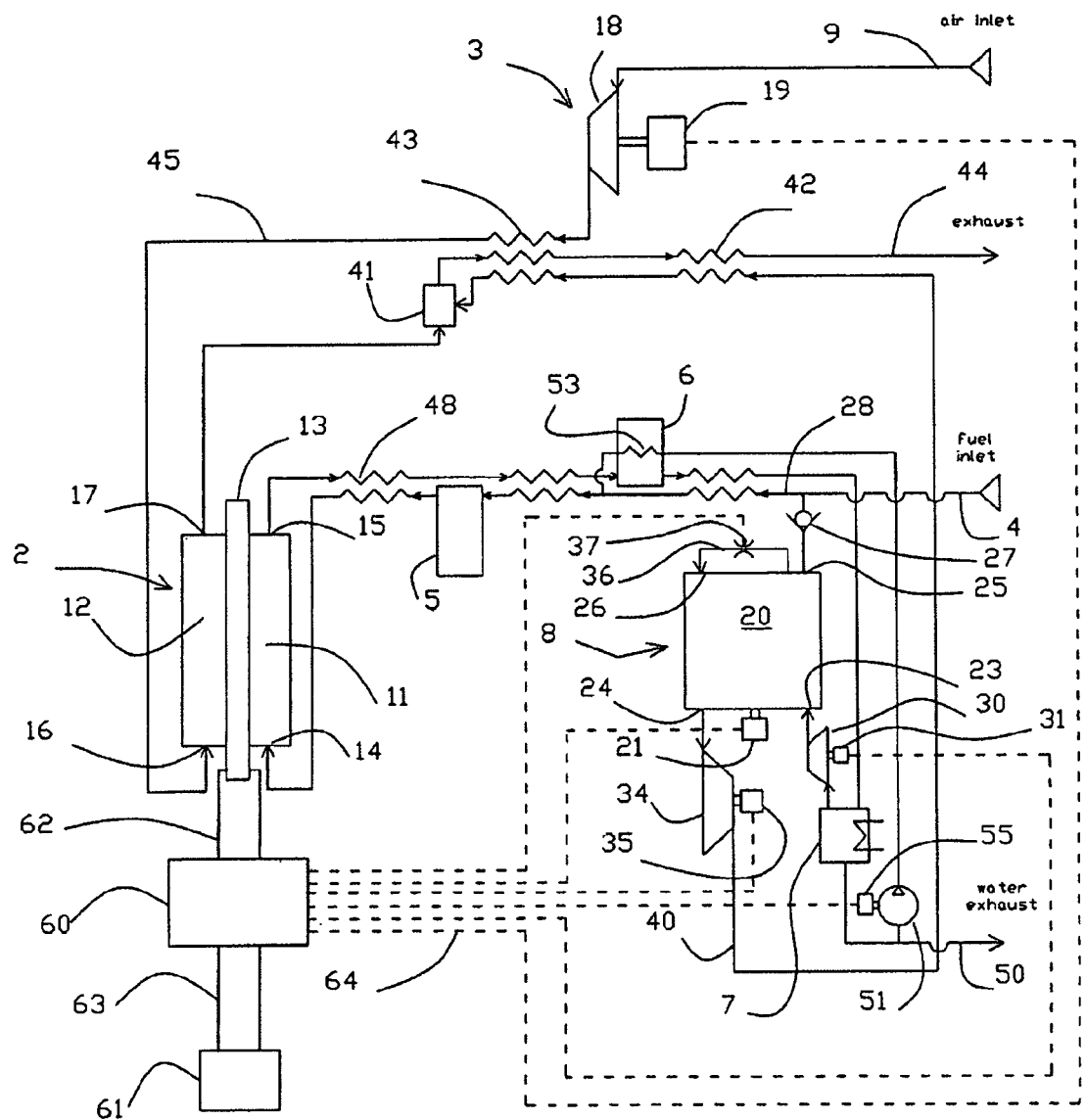
FIGS. 1 through 5 are simplified schematics of alternative SOFC power plant embodiments using an exemplary rotary adsorption module with vacuum swing regeneration for enrichment and recycling of hydrogen from the anode exhaust gas.

A hydrogen-enrichment rotary adsorption module is incorporated as an exemplary gas separation means for enriching hydrogen from anode exhaust and/or concentrating or removing carbon dioxide from the anode exhaust in conjunction with a high temperature fuel cell system according to an embodiment of the present invention in FIGS. 1-7. Embodiments shown in FIGS. 1-5 may preferably use vacuum swing pressure swing (VPSA) for adsorber regeneration. The embodiments of FIGS. 6 and 7 may be regenerated by displacement purge using the oxygen-depleted cathode exhaust gas as sweep gas, assisted by thermal swing regeneration provided by remaining sensible heat of the cathode exhaust gas. In other embodiments (not shown), nitrogen-enriched sweep gas could be provided as exhaust gas from an oxygen-enrichment VPSA system providing enriched oxygen as cathode feed gas (or as oxidant for fuel processing by autothermal reforming or catalytic partial oxidation).

As used herein, a "rotary adsorption module" includes, but is not limited to, either a device wherein an array of adsorbers rotates relative to a fixed valve face or stator or a device wherein the rotary valve face rotates relative to a stationary array of adsorbers. Illustrated embodiments show the adsorbers mounted in a rotor, with the rotor in a housing which is a stator with fixed valve faces. Alternative rotary gas adsorption modules suitable for application to the depicted embodiments are described in the Applicant's previously mentioned copending patent application Ser. No. 10/389,539.

The anode exhaust may be recuperatively cooled to water gas shift, and then further cooled to the condenser and the rotary adsorption module. The enriched hydrogen may be mixed with incoming fuel, and may then be recuperatively heated with the fuel for admission to the pre-reformer. Steam may be added to the fuel as needed, or else may be maintained by direct recycle of anode exhaust gas containing steam.

FIGS. 1-5

FIGS. 1 through 5 show simplified schematics of alternative SOFC power plant embodiments using a fuel such as natural gas or methanol or paraffinic gasoline, with the SOFC having a pre-reformer and working at substantially atmospheric pressure with a single stage vacuum PSA (VPSA) as the hydrogen gas separation means.

All of these exemplary embodiments are illustrated using the VPSA to enrich hydrogen while stripping $CO_2$ from the anode exhaust gas, with the hydrogen enriched light product to be recirculated with makeup fuel back to the anode inlet. Recycle of hydrogen and other fuel components will ensure that fuel starvation will not take place toward the end of the anode channel approaching the anode outlet, so very high fuel utilization can be achieved in the SOFC stack. The ultimately achievable fuel utilization fuel utilization will be determined by the recovery of hydrogen and other light product fuel components that can be achieved in the PSA unit, and accordingly preferred embodiments incorporate heavy reflux to achieve high recovery of light fuel components in the recycle light product stream of the PSA. Hydrogen recycle will boost the concentration of hydrogen throughout the anode channel, and will facilitate operation with minimum supplemental steam at the anode inlet, so that a high voltage efficiency can be achieved.

Referring to FIGS. 1-5, the fuel cell power plant 1 includes an SOFC stack 2 cooperating with air supply means 3, fuel supply means including a fuel inlet 4 and fuel processing means or pre-reformer 5, and means for establishing enriched hydrogen recycle including a water gas shift reactor 6 and a condenser 7 cooperating with a PSA or VPSA system 8 for removing excess fuel cell reaction products steam and carbon dioxide. Air is admitted to the air supply means 3 at air inlet 9.

The SOFC stack 2 includes an anode channel 11 and a cathode channel 12 separated by the oxygen ion conductive ceramic electrolyte 13 supporting the anode and cathode catalysts. The anode channel has inlet 14 and outlet 15. The cathode channel has inlet 16 and outlet 17. Feed air is provided by air blower 18 to the cathode inlet at substantially the working pressure of the SOFC system. The air supply means 3 includes an air blower 18 driven by variable speed motor 19, together with recuperative heat exchange means.

The SOFC cooperates with a hydrogen enrichment gas separation system, here shown as a PSA or VPSA system 8 which in preferred embodiments will include multiple adsorbers operated cyclically in parallel, desirably in the format of a rotary adsorber 20. Examples of such PSA or VPSA systems are disclosed in the Applicant's prior patents and patent applications, such as U.S. Pat. Nos. RE38,493, 6,451,095, 6,406,523 and 6,176,897 and the US patent applications incorporated by reference above for example. As more fully described disclosed in those references, the rotary adsorber includes an array of substantially identical adsorbers cooperating with relatively rotating valve faces which coordinate the cyclic pressure and flow regime of the VPSA cycle at an operating cyclic frequency. A first rotary valve face communicates to a first end of the adsorbers, and a second rotary valve face communicates to a second end of the adsorbers. As described in the Applicant's prior issued patents and pending patent applications, the array of adsorbers may be included within a rotating assembly engaged with first and second valve faces; or alternatively the array of adsorbers may be stationary while the rotary valve faces are then provided within rotary distributor valves.

Rotation of the first and second valve faces may be established by a controllable motor means, such as variable speed motor 21, so that the PSA or VPSA cycle frequency may be established directly by the speed of motor 21. Each of the adsorbers is shown connected alternatingly at its first end through the first valve face to a feed port 23 and to an exhaust port 24; and at its second end through the second valve face to a product port 25 and a purge port 26. Typically, an adsorber may be connected to feed port 23 and product port 25 when the total pressure within that adsorber is substantially the upper working pressure of the PSA or VPSA cycle; while an adsorber may be connected to purge port 26 and exhaust port 24 when the total pressure within that adsorber is substantially equal to the upper working pressure of the PSA or VPSA cycle. In the examplary embodiments to be described, the lower working pressure may be a subatmospheric pressure established by a vacuum pump so that the gas separation system will henceforth be described as a VPSA system. However, it would be entirely feasible within the scope of the invention for the working pressure of the SOFC stack and thus the upper working pressure to be considerably elevated above ambient pressure, and then the lower working pressure may be at least ambient pressure so that no vacuum pumping is needed and the gas separation system may be a PSA rather than VPSA system.

Product port 25 is connected by non-return valve 27 to fuel feed conduit 28. Feed gas (typically containing a mixture of hydrogen, methane, carbon monoxide, carbon dioxide and water vapour) to the VPSA is delivered to feed port 23 by fuel gas blower 30 at slightly above the working pressure of the SOFC system, and thus substantially establishing the higher pressure of the VPSA cycle. Fuel gas blower 30 is powered by variable speed motor 31. Exhaust gas enriched in CO2 is withdrawn from exhaust port 24 of the VPSA by vacuum pump 34, which establishes the lower pressure of the VPSA cycle and is powered by variable speed motor 35. Purge gas may be provided to purge port 26 as light reflux gas through pressure letdown means 36 (here shown as a variable aperture restrictor orifice 37). The light reflux gas may be similar gas to the hydrogen enriched product delivered from port 25, and may be obtained from port 25 or another port at an intermediate pressure between the upper and lower working pressures of the VPSA cycle. Suitable control means as known in the art may be provided for adjustment of restrictor orifice 37 to vary the flow therethrough at a desired pressure drop across restrictor 37, so that the light reflux flow may be maintained proportionately under variation of the feed, exhaust and product flows associated with VPSA system by proportionate speed adjustment of motors 21, 31 and 35.

It is also contemplated within the invention that pressure letdown means 36 might alternatively be provided as a variable speed expander providing energy recovery from the pressure letdown step, with the recovered energy applied to assist any of the mechanical compression or fluid pumping loads of the power plant.

Tail gas burner is conveyed by conduit 40 to burner 41 (which may be a catalytic combustor if the tail gas fuel content is very low, or in the opposite case could be a heat engine) to recover residual fuel calorific value from the exhaust. The burner 41 cooperates with recuperative heat exchangers 42 and 43 to recover heat from the exhaust conduit 44 and to preheat air admitted to cathode inlet 16 by conduit 45. On the anode side, recuperative heat exchangers 46, 47 and 48 are provided to transfer heat between anode loop gas flows respectively flowing from anode outlet 15 and flowing towards anode inlet 14, while maintaining desired working temperatures in the SOFC stack, the pre-reformer 5, and the water gas shift reactor 6. A portion of the SOFC product water condensed in condenser 7 is discharged by water exhaust conduit 50, while the balance of this water is pumped by water pump 51 into conduit 52 and heat recovery coil 53 cooperating with water gas shift reactor 6 for heat recovery to generate steam, which in the embodiment of FIG. 1 is admitted to fuel feed conduit 28 upstream of pre-reformer 5. Water pump 51 is driven by variable speed motor 55.

The fuel cell is operated on a fuel mixture admitted to anode inlet port 14, this fuel mixture preferably including methane and recycled hydrogen, and desirably with the lowest steam/carbon ratio at the anode inlet consistent with safety from detrimental carbon deposition in the anode channel. With conventional nickel-based materials for internal reforming SOFC anodes, the required steam/carbon ratio may be in the range of 2 to 2.5, with some reduction enabled by enriched hydrogen recycle and effective removal of higher hydrocarbons by pre-reforming. In inventive embodiments to facilitate SOFC operation with minimal or no steam addition at the anode inlet, the SOFC may be provided with a first electrocatalyst zone near the anode inlet and a second electrocatalyst zone near the anode outlet, either as different catalytic flavours in a single SOFC, or in separate SOFC stages in series.

The first anode zone may desirably use a catalyst composition that inhibits carbon deposition, and may also be non-reactive to steam methane reforming. Such anode materials (e.g. copper-ceria cermets) have been considered in the art for "direct oxidation" of hydrocarbons fed dry to the SOFC anode inlet; and would enable operation with a steam/carbon ratio of less than 1.5, and preferably in the range of 0 to 0.5, at anode inlet 14. The illustrated embodiment according to the first aspect of invention provides hydrogen recycle, so that the more reactive hydrogen will be preferentially oxidized in the first zone. Higher hydrocarbons might be oxidized (or hydrogenated) to some extent in the first anode zone, but would not be catalyzed into carbon deposition failure mode. Steam builds up as the reaction proceeds, so downstream in the second anode zone a more conventional "internal reforming" catalyst (e.g. nickel cermet) may be used to steam reform the methane into more hydrogen, while consuming some of the steam generated by hydrogen oxidation in the first anode zone. Voltage efficiency of the SOFC will be greatly enhanced by operation with the lowest practicable steam/carbon ratio, in combination with enriched hydrogen recycle, so as to achieve the highest ratio of hydrogen to steam over the SOFC anode.

Anode exhaust gas is subjected to cooling by recuperative heat exchange with the incoming fuel and hydrogen-enriched recycle stream in recuperative heat exchangers 48 and 47, to water gas shift in reactor 6 in order to increase hydrogen and $CO_2$ concentrations prior to the PSA separation, and to water removal by condensation in condenser 7 before being admitted as feed to the PSA unit 8. A blower 30 may be provided to boost the feed pressure to the PSA unit, and to drive circulation through the anode recycle loop.

The enriched hydrogen product of the VPSA is mixed with fresh fuel makeup, which is then delivered with supplemental stream generated with heat recovery from the water gas shift reactor (with a Heat Recovery Steam Generator (HRSG) 53 integrated with the water gas shift reactor for cooling thereof). Supplemental steam may also be generated by heat recovery from the auxiliary burner 41 exhaust.

The mixture of fuel, recycled hydrogen and steam in conduit 27 is admitted to a pre-reformer 5 before entering the anode channel inlet 14. The main purpose of pre-reforming is to reduce the concentration of higher hydrocarbon components whose decomposition could result in carbon deposition within the anode channel.

Preferably, the prereformer is operated at a relatively low temperature (e.g. about 500° C.), while the SOFC may operate at any suitable temperature in the typical range of about 500° C. to about 1000° C. By operating at relatively low temperature and with a substantial excess of recycled hydrogen, the endothermic steam reforming reactions (converting hydrocarbons to syngas) can be thermally balanced with the exothermic methanation and water gas shift reactions together with exothermic hydrogenation and hydrogenolysis of higher hydrocarbons, so that the pre-reforming step is approximately isothermal.

The calorific value of residual fuel components in the tail gas (heavy product) stream may be recovered by combustion in burner 41, whose output heat may be used for start-up heating of the SOFC, and also to maintain SOFC stack temperature in any stand-by idling mode. The burner exhaust gas passes through a recuperative heat exchanger 43 which preheats the air feed to the cathode inlet. During startup, this provides heat to warm up the SOFC stack. The burner may need to be a catalytic burner in view of the low BTU value of the tail gas. The burner adds heat to the cathode exhaust air which in some embodiments may recuperatively heat an externally fired gas turbine compressing a feed air compressor and a high temperature expander or turbine.

Figure 2:
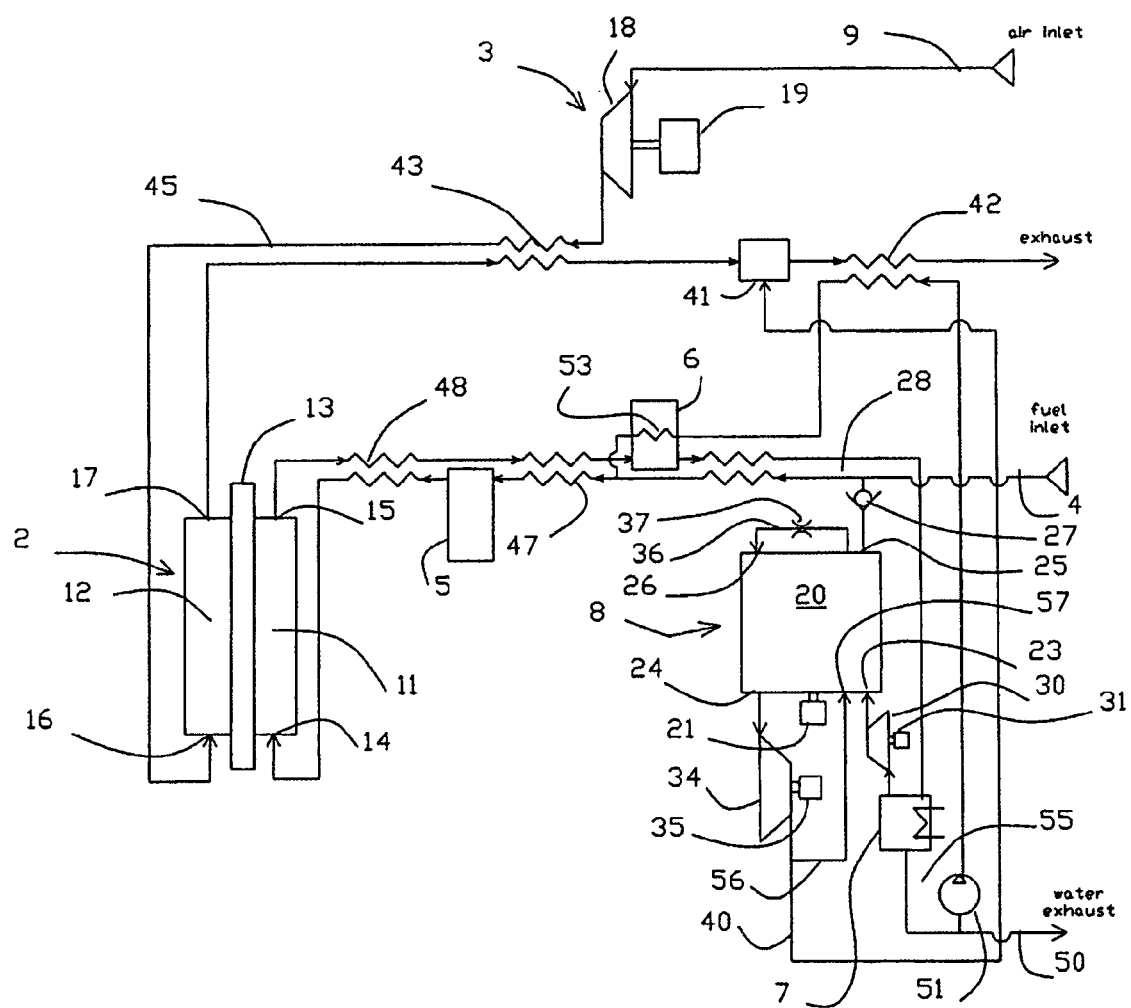

In some illustrated vacuum PSA embodiments (e.g. FIGS. 2 and 5), a first portion of the heavy product stream (preferably the countercurrent blowdown) is delivered as the $CO_2$ enriched gas to burner 41, while a second portion (preferably the exhaust from low pressure purge) is recycled by conduit 56 as heavy reflux back to the PSA. A vacuum pump 34 is provided to exhaust the heavy product from the first valve face, and to deliver the heavy product and heavy reflux streams. Separate vacuum pumps might be used for the heavy product and heavy reflux, to take advantage of the typically higher $CO_2$ concentration of the countercurrent blowdown as compared to the exhaust from low pressure purge. The embodiment of FIG. 1 illustrates an example without heavy reflux, so that lower hydrogen recovery from the anode exhaust gas will be achieved with somewhat lower vacuum pump power consumption in this case. In the embodiment of FIG. 2, the heavy reflux feature enables high recovery of hydrogen and other fuel components to the anode recycle loop, so fuel value in the exhaust gas provided to burner 41 is minimal. Accordingly, burner 41 is a catalytic combustor operated at relatively low temperature, with minimal heat recovery opportunity.

It may be noted that the single stage PSA of the above embodiments (FIGS. 1-3) cannot readily achieve very high $CO_2$ concentration in the heavy product. High $CO_2$ concentration achieved by the single stage PSA would result in tail gas of very low BTU value, unsuitable for reheating and combustion to augment the gas turbine power output. A further serious problem arises from nitrogen accumulation in the anode recycle loop. Nitrogen is typically introduced as a minor component of natural gas. While the PSA can readily remove nitrogen from hydrogen, it could only achieve relatively low recovery of other fuel values (e.g. carbon monoxide and methane) if operated to restrict nitrogen accumulations by allowing nitrogen to exit with the heavy product. Attainable SOFC fuel utilization would thus be limited by loss of some fuel components to the tail gas exhaust, with that calorific value to be recovered at lower efficiency by tail gas combustion in the burner.

Performance of the single stage PSA can be improved by using a two stage cycle as disclosed in the Applicant's U.S. patent application Ser. No. 10/389,539, which issued on Jun. 17, 2008, as U.S. Pat. No. 7,387,849, and/or Ser. No. 10/671, 750, which issued on Oct. 23, 2007, as U.S. Pat. No. 7,285, 350. A vent gas may be released between the hydrogen enrichment and carbon dioxide enrichment stages. This vent gas will purge nitrogen from the anode loop, while also providing a relatively high BTU fuel stream for the burner, as the vent gas will be much lower in CO2 concentration than the heavy product delivered from the first valve face.

The two-stage PSA configuration has several important advantages, as follows. The $CO_2$ enrichment stage reduces irreversibilities of the PSA process, resulting from large $CO_2$ concentration differences between the feed and the heavy reflux streams. Hydrogen recovery is enhanced for a given flow and power consumption of heavy reflux. Very high $CO_2$ concentration, up to essentially 100% purity, can readily be achieved if desired for $CO_2$ delivery as a valued byproduct or alternatively for sequestration disposal underground.

A vent stream is released from between the PSA stages so that high performance in H2 purification and $CO_2$ concentration can be achieved simultaneously. This vent stream purges nitrogen from the anode recycle loop, while containing only a modest amount of $CO_2$ so the vent stream can be a relatively high BTU fuel for satisfactory use in the burner.

Figure 3:
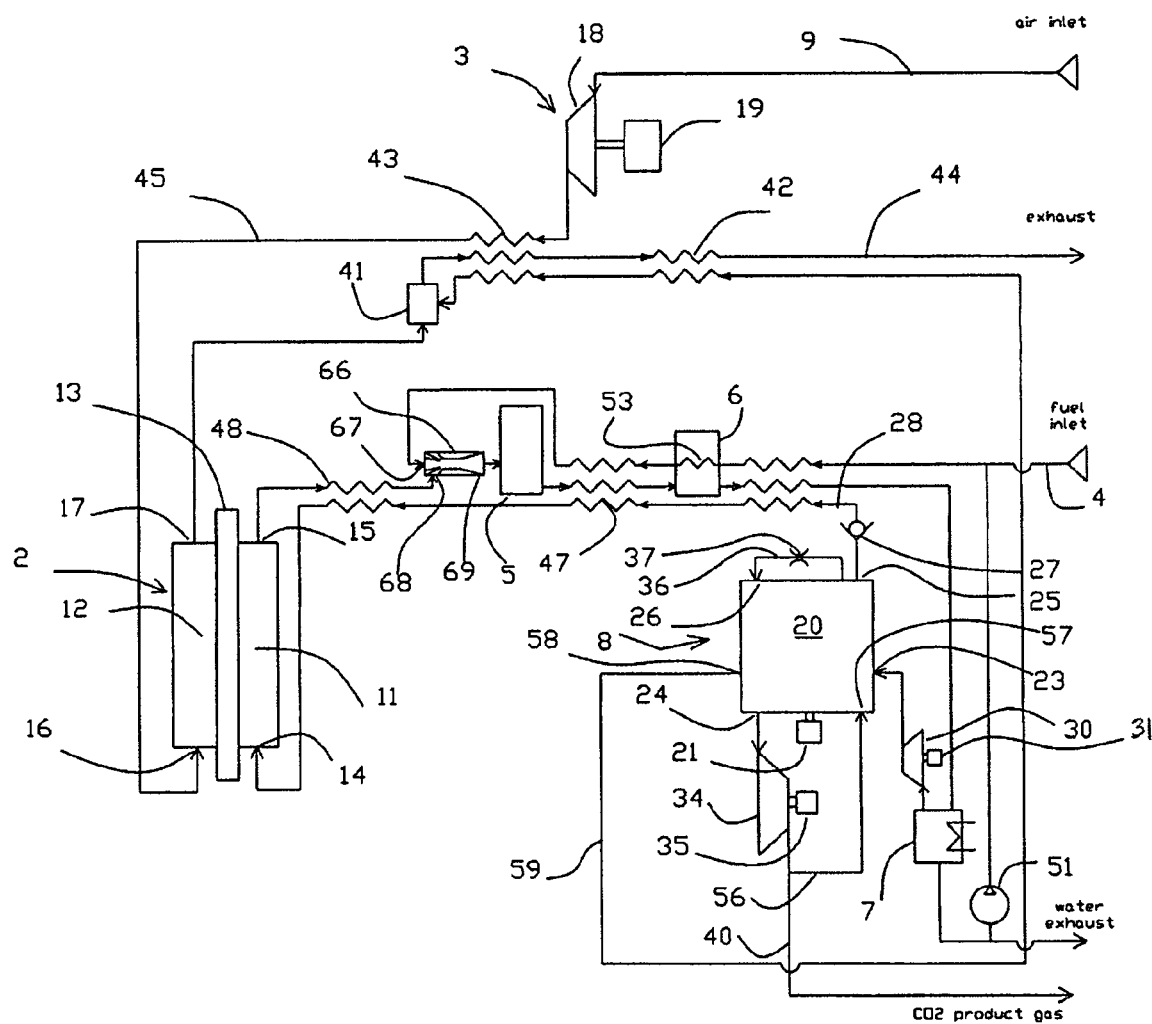
Figure 4:
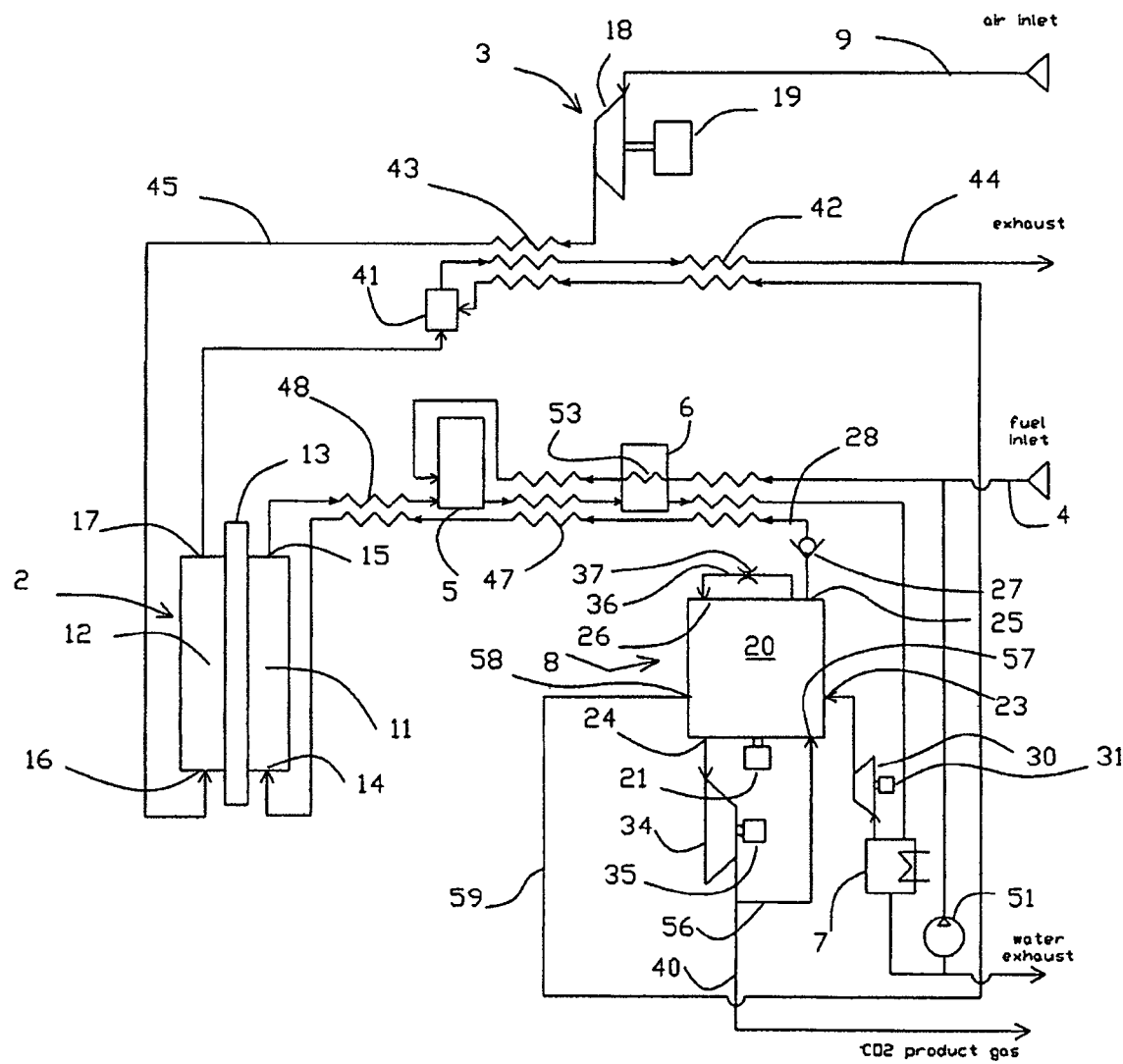

In FIGS. 3 and 4, the vacuum PSA system is a two stage configuration to achieve higher recovery of hydrogen and other fuel components, with exhaust port 24 and heavy reflux port 57 communicating to the first end of the adsorbers, while feed port 23 and a vent gas exhaust port 58 communicate from the first valve face or from other suitable valve means such as a third rotary valve face to intermediate portions of the adsorbers. The portions of the adsorbers adjacent the second ends of the adsorbers serve as a stripping stage to remove carbon dioxide from hydrogen and other fuel components, while the portions of the adsorbers adjacent the first ends of the adsorbers serve as an enrichment stage to substantially purify carbon dioxide. The exhaust gas delivered from exhaust port 24 to vacuum pump 34 and conduit 40 will be highly enriched $CO_2$ to be delivered as a valuable product or for underground sequestration if desired. The vent gas delivered from vent gas port 58 would have useful fuel value together with some inert components such as nitrogen, and will be delivered by conduit 59 to burner 41. In these embodiments, the reason for having a separate vent gas stream is to purge inert components from the anode loop, as would be required if the purity of the carbon dioxide in conduit 40 is to be so high as to prevent satisfactory purging of inerts in that stream.

Variable speed motors (preferably electric motors although hydraulic or pneumatic motors could alternatively be used) are provided to drive the vacuum pump, blower and water pump mechanical loads of the SOFC plant, as well as the rotary adsorber module of the VPSA. If a separate VPSA unit is used for oxygen enrichment of cathode air supplied to the SOFC, variable speed motors may also be provided to drive and control the speed of compression machinery (e.g. a vacuum pump) and the rotary adsorber associated with the oxygen enrichment VPSA. A hydrogen compressor (likewise with a controllable drive) may also be provided to compress a fraction of the purified hydrogen from the PSA for compressed storage or delivery to external hydrogen consumption. All of the preferably electric motors may be controlled by a control unit means, such as electronic controller 60 (shown in FIG. 1 but also used in other embodiments) which monitors and conditions power delivered by the SOFC to its external electrical load 61. Unconditioned DC power from the SOFC 2 is delivered by bus 62 to a power conversion section of electronic controller 60, while conditioned output power (DC or AC) is delivered by lines 63 to the load. Dashed lines 64 indicate power and control links from controller 60 to each of the auxiliary motors 19, 21, 31, 35, and 55, and to light reflux pressure letdown means 36. Electronic controller 60 may react to changes in demand from the load, or may incorporate an operator command interface to drive changes in the power delivered to the load and thus control the load itself. The electronic controller will also incorporate control sequences for SOFC plant startup and shutdown procedures, as initiated either automatically or by an operator.

It will be appreciated that the above control and power conditioning functions may be executed with any of the many techniques known in the art for power conversion and control. The DC power delivered by the SOFC (at a declining voltage with rising current) may be converted to AC power at constant frequency and substantially constant voltage; or to variable frequency AC power for regulating the speed of an induction motor or synchronous motor, or to variable voltage DC power for regulating the speed of a DC motor, for the case that the load is a variable speed motor whose speed is to be actively controlled by the controller 60. The auxiliary electric motors 19, 21, 31, 35 and 55 may for example be selected to be induction motors or permanent magnet synchronous motors, and each controlled by variable frequency AC power delivered from the controller for these internal loads. The speed of motors 21, 31, 35 and 55 may be regulated (optionally by a single variable frequency controller) in approximate proportion to the SOFC delivered current in order to maintain fuel supply proportionate to demand, while motor 19 driving the feed air blower should preferably be controlled with a purposely exaggerated variation of speed corresponding to variation of SOFC current, so that an disproportionately large air flow will assist cooling the stack at higher SOFC current, while a disproportionately low air flow will help conserve heat within the stack at low SOFC current. It will further be appreciated that the above power conditioning and control functions may be consolidated into an integrated electronic control system, or may be implemented by several electronic power conversion and control units operating cooperatively.

Alternatively to the use of electric motors for all auxiliary drives, heat recovery or combustion powered prime movers (e.g. steam turbine, gas turbine, Stirling engine or internal combustion engine) may be used to power any of the mechanical loads, or to assist a electric motor driving any of the mechanical loads so as to recover heat or unburnt fuel while reducing parasitic consumption of electrical power generated by the fuel cell.

Figure 5:
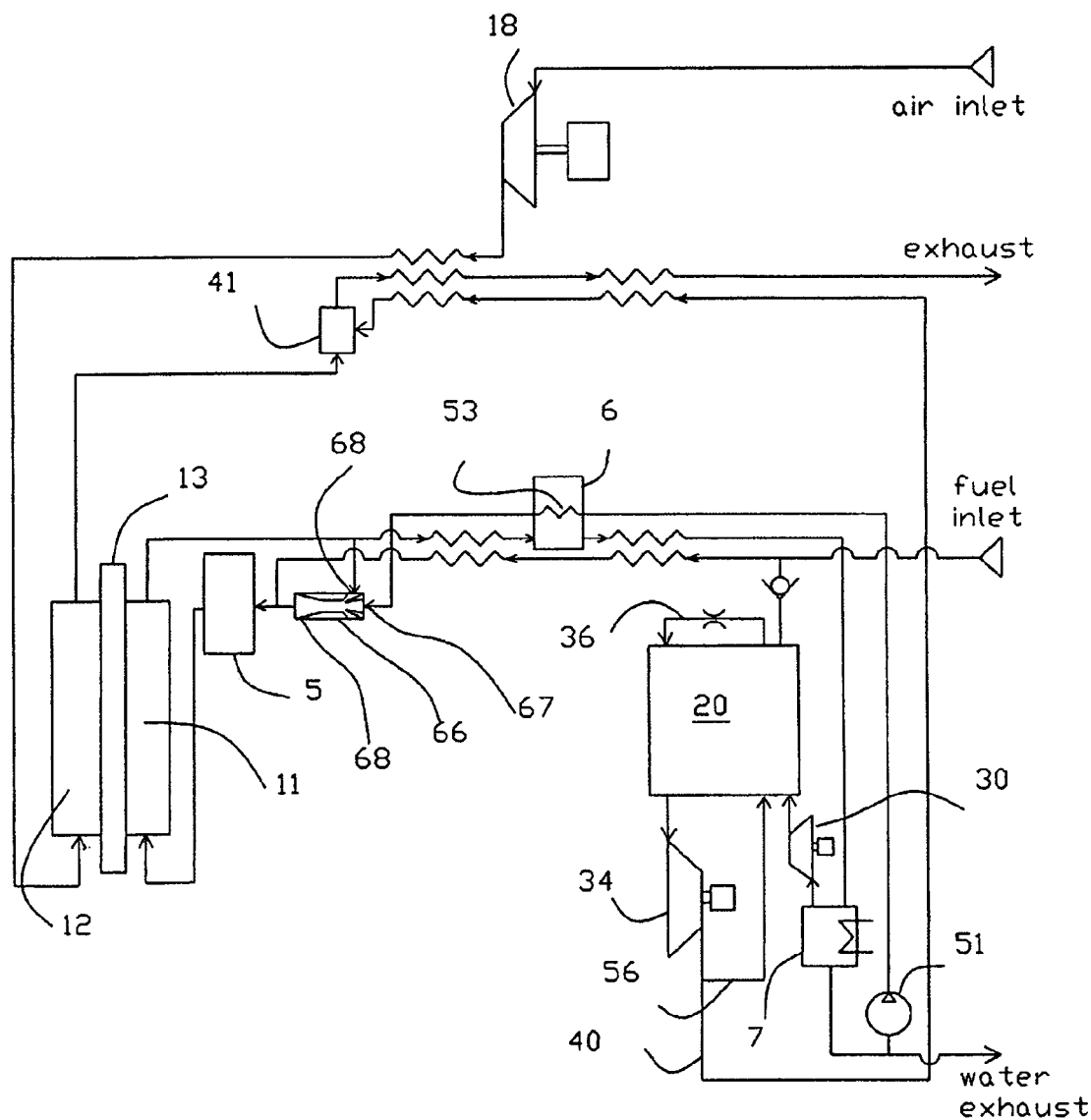

If the water pump 51 delivering water from the condenser 7 to the HRSG 53 (recovering heat from the water gas shift reactor 6 and/or the exhaust gas from burner 41 or an equivalent gas turbine) operates at an elevated pressure, some or all of the steam may be used as motive fluid for an ejector 66 as shown in FIGS. 3 and 5 to drive anode gas circulation or recirculation, or alternatively to a steam expander (not shown). Ejector 66 includes a nozzle 67 for the steam as motive fluid, a suction inlet 68 and an outlet diffuser 69 after mixing of the steam from nozzle 67 with the anode gas from suction inlet 68. Although anode gas recirculation blower 30 is retained in FIGS. 3 and 5, this blower will have reduced power consumption and might be eliminated if ejector 60 is sized to overcome flow resistance pressure drops in the anode loop (including the SOFC anode channel, the pre-reforming and water gas shift reactors, heat exchangers 47 and 48, condenser 7 and the PSA unit 8. As ejector 66 effectively delivers compression work recovered from SOFC plant process heat sources, the SOFC power plant can therefore have a heat recovery strategy, thermally integrated with the SOFC and with fuel processing.

For MCFC applications, some or all of the enriched $CO_2$ exhaust gas from the VPSA unit would be delivered to the cathode inlet to provide required $CO_2$ for successful MCFC operation.

FIGS. 3 and 4

FIGS. 3 and 4 show simplified schematics of alternative SOFC power plant embodiments, with the SOFC working at substantially atmospheric pressure and using a vacuum PSA (VPSA) 8 as the fuel gas separation means. Instead of delivering substantially purified hydrogen from the hydrogen PSA with fresh fuel and supplemental steam to the pre-reformer, these embodiments directly recycle the SOFC anode exhaust gas to the pre-reformer together with makeup fuel. This advantageously captures the waste heat and steam from the SOFC anode exhaust to assist pre-reforming, which may be conducted at low temperature (about 500° C.) in order that the pre-reforming step is approximately isothermal.

Alternatively in these embodiments, the pre-reforming step may be conducted at a elevated temperature approaching that of the SOFC anode exhaust up to e.g. 1000° C., so that higher reaction rates will be achieved. The pre-reformer at higher temperature would use a smaller catalyst inventory, while greater conversion to syngas may be achieved albeit in an adiabatic mode undergoing a substantial cooling of the anode gas stream being processed across the pre-reformer.

The PSA may preferably now be working to remove $CO_2$ and some water vapour from the recycle fuel stream, rather than operating primarily to purify hydrogen. In that mode of operation, it may be attractive to operate the PSA at relatively elevated temperature, using $CO_2$-selective adsorbents known in the art such as alkali modified alumina or potassium carbonate promoted hydrotalcite. Suitable such adsorbents may be chosen to selectively remove $CO_2$ from humid gas streams. In particular, hydrotalcite is selective for $CO_2$ over water vapour, so the light product gas recycled to the SOFC using hydrotalcite may be expected to contain enriched fuel values with sufficient water vapour for avoiding carbon deposition problems. The approach of operating at elevated temperature (up to about 400 to about 500 C with hydrotalcite) facilitates good process thermal efficiency and simplification by removal of some recuperative heat exchangers. The PSA unit itself may operate as a regenerative heat exchanger, e.g. by maintaining the second valve face at a more elevated temperature and the first valve face at a less elevated temperature so that there is a temperature gradient along the flow path through the adsorbers. Furthermore, water gas shift catalyst (including any of the known high temperature, low temperature, or sulfur-tolerant water gas shift catalysts) may be included in a zone of the adsorbers so that the water gas shift reactor is integrated with the PSA unit. The adsorbent adjacent the first valve face may be chosen from those adsorbents selective for $CO_2$ at temperatures in the approximate range of 200° C. to 500° C. (one such exemplary adsorbent known in the art being potassium carbonate promoted hydrotalcite), so as to remove carbon dioxide away from the water gas shift catalyst zone. The adsorbent adjacent the second valve face may be alumina gel or a hydrophilic zeolite, so as to capture water vapour to be concentrated over the water gas shift catalyst.

FIG. 3 also illustrates use of an ejector 66 to drive or assist driving gas circulation around the anode recycle loop. The fuel is externally compressed (or delivered from a pressurized fuel storage container) at a pressure well in excess of the SOFC system working pressure. Water recycled from the condenser is pressurized to the driving pressure by the water pump, and mixed with the fuel before recuperative preheating and steam generation in the water gas shift reactor HRSG, so that ample driving fluid and enthalpy is available for the ejector.

FIG. 5

FIG. 5 shows an embodiment with the use of an ejector to drive direct internal recycle of anode exhaust gas, from the anode outlet back to the anode inlet through the pre-reformer. Such internal recycle implemented alone is known in the prior art, as particularly useful for recycle of SOFC product steam to maintain a satisfactory steam/carbon ratio within an internally reforming SOFC, however, in FIG. 5, the anode exhaust is split between an internal recycle fraction to be recirculated directly to the pre-reformer and thence to the anode inlet by the ejector, and an external fraction which will be processed by the water gas shift reactor and the PSA unit so that a hydrogen-enriched portion thereof may be recycled to the pre-reformer and thence to the anode inlet. The ejector 66 is shown in this embodiment as driven by steam generated by a heat recovery steam generator heated by the exothermic water gas shift reactor. Alternatively or in addition, steam may also be generated in a bottoming cycle by heat recovery from the cathode exhaust after initial heat recovery to the gas turbine. The steam generated by either or both the water gas shift reactor and the cathode exhaust may be superheated to substantially the working temperature of the SOFC. It will be appreciated that steam may readily be generated by heat recovery (from even a low temperature water gas shift reactor operating at e.g. 300 C) at an elevated pressure of e.g. 10 atmospheres, so that ample enthalpy is available to drive the ejector. The steam required for a suitable steam/carbon ratio is thus provided in part by internal recycle from the anode exhaust, and in part by heat recovery from the water gas shift reactor which also provides driving power for recirculation by the ejector. A portion of this steam may also be provided to the rotary adsorber 20 for low pressure or high pressure purge steps in embodiments using a high temperature adsorbent selective for carbon dioxide in the presence of steam. The internal recycle also provides a benefit of recycling hydrogen, so that a smaller PSA unit may be used to supply the enriched hydrogen recycle, with a correspondingly smaller heavy reflux compression power load. The water gas shift reactor may have to be larger in the case of combined internal and external recycle, but this provides benefits of enhanced steam generation potential and enhanced SOFC cooling by internal reforming which will be more endothermic as a result of increased recycled $CO_2$ concentration in the anode channel as a result of internal recycle.

For turndown to low delivered power generation, the ejector may be controlled by providing a variable nozzle (or a plurality of fixed nozzles in parallel, with isolation valves to control the number of nozzles being used at any time). Proportionately greater internal recycle of steam bearing anode exhaust gas may be desirable at low power output in order to augment the steam/carbon ratio at low current, while also reducing the hydrogen/steam ratio over the anode so as to reduce open circuit voltage under turndown conditions.

Figure 6:
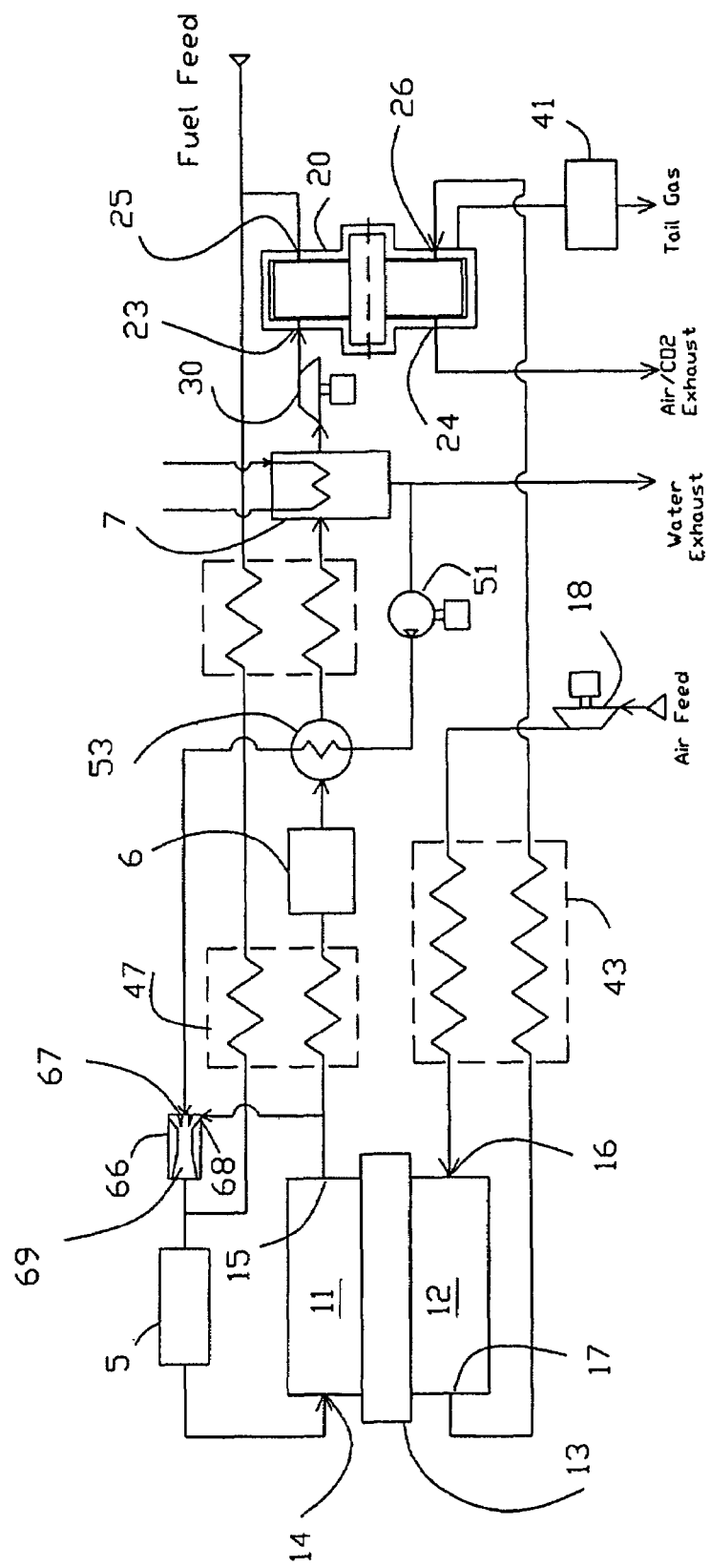
FIGS. 6 and 7 are simplified schematics in which a hydrogen enrichment rotary adsorption module is regenerated by purging with cathode exhaust gas.
Figure 7:
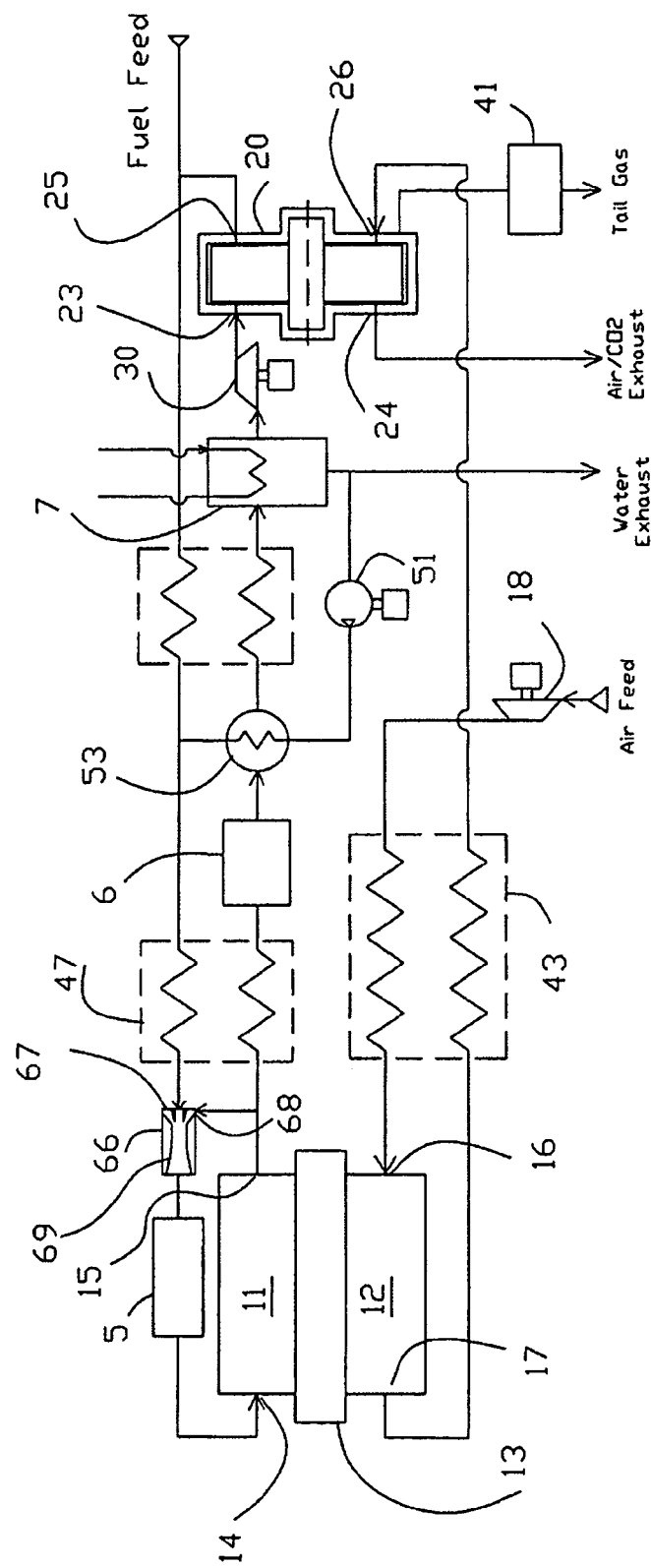

FIGS. 6 and 7

FIGS. 6 and 7 show embodiments with the hydrogen enrichment rotary adsorption module 20 regenerated primarily by cathode exhaust gas purge, rather than by pressure swing. As in FIG. 1, FIG. 6 illustrates the speed control of the variable speed motors driving the mechanical loads by a controller 60 which also monitors and conditions the power delivered from the SOFC stack to the external electrical load.

FIG. 6 shows a combination of internal recycle driven by a steam ejector 66, together with recycle of enriched hydrogen where the hydrogen has been enriched by a rotary adsorber module regenerated by purging with cathode exhaust gas, wherein the driving fluid for the ejector is again steam generated by heat recovery from the water gas shift reactor 6, with the steam derived from SOFC product water condensed from the anode exhaust gas and pressurized by the water pump 51.

FIG. 7 illustrates a similar embodiment to FIG. 6, with the internal recycle ejector 66 here driven by the combined fuel and enriched hydrogen recycle from the rotary adsorption module. It will be appreciated that the fuel (e.g. natural gas) must be provided at a suitable feed pressure, while the recycle blower will ensure that the enriched hydrogen recycle stream is also delivered from the rotary adsorption module at substantially the same feed pressure, the feed pressure being sufficient to drive the ejector. In this embodiment, low pressure steam is blended with the hydrogen-enriched recycle stream to assist driving the ejector. As more low pressure steam could be generated by heat recovery from the cathode exhaust, the amount of steam to be contributed by internal recycle may be lower, in which case the internal recycle flow may also be relatively small so that the necessary feed pressure to the ejector nozzle may also be reduced.

FIG. 8

Figure 8:
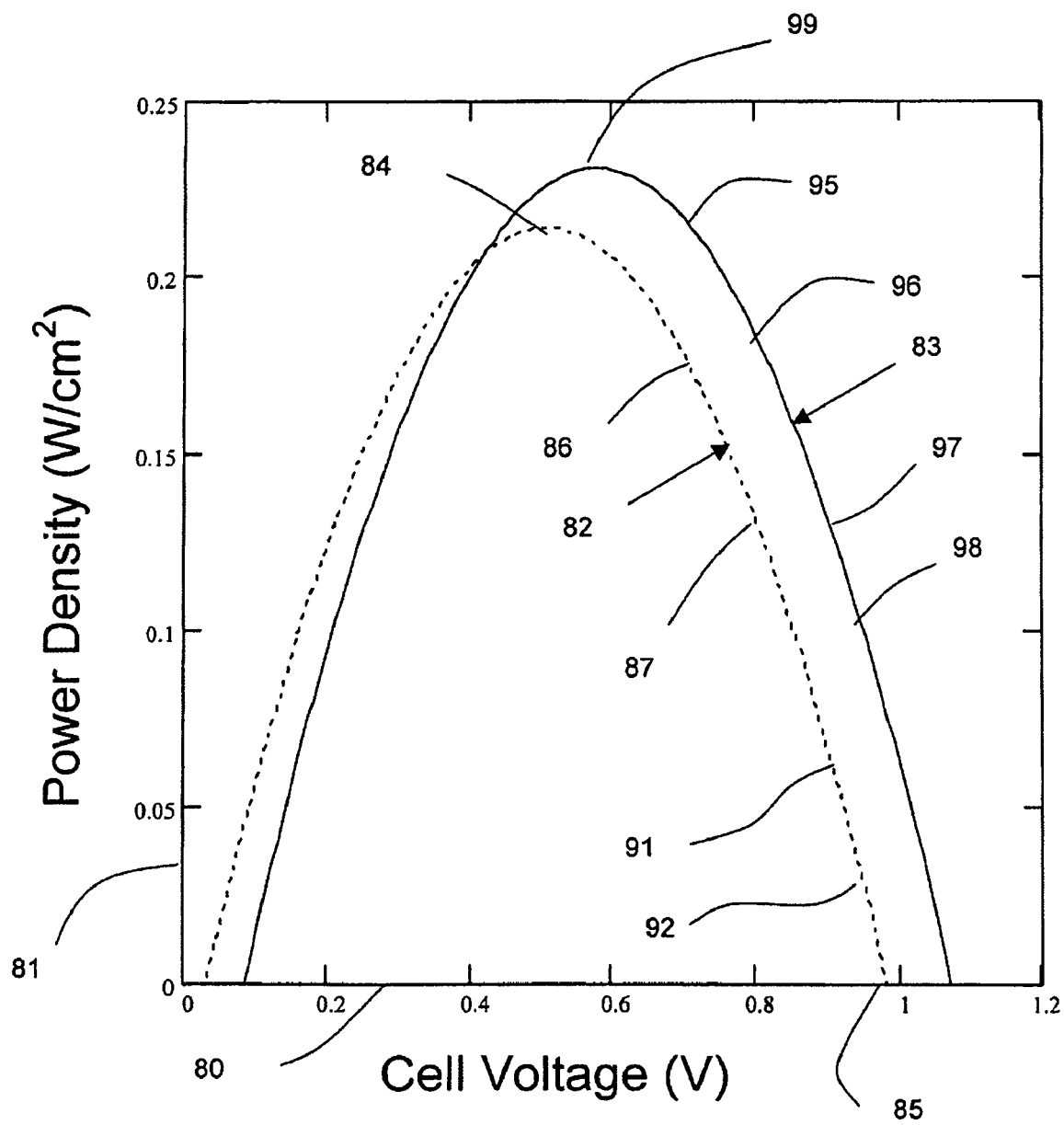
FIG. 8 is a graph of cell voltage versus power density ($W/cm^2$) illustrating output power versus cell voltage for SOFC stacks with and without enriched hydrogen recycle.

FIG. 8 shows output power versus cell voltage for SOFC stacks with and without enriched hydrogen recycle, calculated for a conventional atmospheric SOFC unit and for the embodiment of FIG. 1. The fuel is taken to be methane, and power generation efficiencies shall be referred to lower heating value. All blowers and other auxiliary mechanical loads are driven by electrical motors powered by the SOFC unit. Efficiency allowances for the mechanical loads are based on typical design operating points of positive displacement compression machinery (rotary lobe blowers, twin screw vacuum pump), in the approximation that these auxiliary mechanical compression efficiencies are taken as constant for any operating power density of the SOFC stack. The assumed component efficiencies and heat exchange losses are applicable to a delivered power rating of 100 kW, in which the SOFC cell voltage and thus the operating current density and power density (hence the size of the stack required to generate the net 100 kW) are varied.

The SOFC cell voltage versus current density characteristic is assumed to be linear, with an illustrative area-specific resistance of 1 ohm-cm$^2$. This rather high area-specific resistance would correspond to either a relatively thick electrolyte as in cathode-supported tubular SOFC cells working at about 1000° C., or a relatively thin electrolyte as in planar anode-supported cells working at about 700° C. The delivered power density may be directly scaled to the specific value of area-specific resistance for any particular SOFC cell configuration and operating temperature.

In FIG. 8, the horizontal axis 80 is the working SOFC cell voltage (volts) at any power density, while the vertical axis 81 is the power density (W/cm$^2$) corrected for efficiency losses due to mechanical auxiliary loads and output power conditioning. Curves 82 and 83 show the power density versus operating cell voltage for respectively (1) a conventional SOFC working with stack fuel utilization of 85%, and (2) the exemplary embodiment of FIG. 1 working with stack fuel utilization of 95% as is readily enabled by the invention.

It will be appreciated that selection of the SOFC design operating ranges in FIG. 1 will be constrained by performance and economic objectives, with higher efficiency being obtained by operating at the highest practicable cell voltage, and lower capital cost of a smaller SOFC stack being obtained by operating near maximum power density at cell voltages about half of the open circuit cell voltage. Voltage efficiency is only about 50% at maximum cell power output (e.g. point 84 of curve 82), while highest voltage efficiency is obtained at uneconomically low current and power densities approaching the open circuit condition (e.g. point 85 of curve 82).

In view of the expected very high capital cost of early production SOFC units, a typical design operating point of a conventional SOFC system may be selected at a cell voltage of about 700 mV, corresponding in the present model to a calculated overall electrical generation efficiency of 51.9%. This efficiency is in the typical range for conventional SOFC systems without auxiliary gas turbine or steam turbine heat recovery cycles. This typical operating point is shown as point 86 on curve 82, where the conventional SOFC power density is about 83% of its maximum at point 84. If higher efficiency were desired with an economic penalty of lower power density, the cell voltage might be set at 800 mV at point 87 of curve 82, raising estimated efficiency to 59.6% while reducing power density to about 61% of maximum.

The technically highest practicable cell voltage will be determined by the need for the SOFC stack to be thermally self-sustaining in steady state operation at its high working temperature, with sufficient heat internally generated to allow for (a) heat leakage, (b) imperfect effectiveness of recuperative heat exchangers preheating feed air and fuel streams, and (c) the endothermic heat of reaction for internal reforming. With careful thermal design of the SOFC stack or more, it would be possible to achieve thermally self-sustaining breakeven at cell voltages in the range of 900 mV (for net power ratings in the order of 50 to 100 kW) to about 950 mV (for power ratings of about 250 kW to 1 MW). Corresponding operating points are shown as points 91 and 92 on curve 82. Such high cell voltages are economically impracticable for the design operating point of conventional SOFC units, as may be seen from FIG. 8, because the SOFC power density would be only 10% to 20% of maximum.

The economic benefits of enhanced efficiency and power density from the present invention will be evident from considering alternative operating points on curve 83. Power densities will be compared to the conventional maximum point 84. Points 95, 96, 97 and 98 on curve 83 correspond to operating points for the SOFC power plant of the invention at cell voltages of respectively 700 mV, 800 mV, 900 mV and 950 mV.

At operating point 95, the inventive SOFC would work at 700 mV, achieving 53.4% efficiency (marginally better than the conventional SOFC at the same voltage) while achieving superior power density of 101% the conventional maximum. Since the conventional SOFC achieves 83% of maximum power density at 700 mV, the inventive SOFC will have capital costs savings of a significantly smaller stack for the same delivered power output.

At operating point 96, the inventive SOFC would work at 800 mV, achieving 62% efficiency (similar to the conventional SOFC at the same voltage) while achieving power density of 86% the conventional maximum. Since the conventional SOFC achieves only 61% of maximum power density at 800 mV, the inventive SOFC will have an even wider advantage of capital costs savings for a smaller stack at the same delivered power output.

For the above examples of operating points 95 and 96, and also for the conventional operating points 86 and 87 likewise working in the range of 700 to 800 mV, the SOFC stack will generate substantial excess high grade heat, which may be recovered in larger SOFC systems by an auxiliary heat engine cycle as in a gas turbine SOFC hybrid. In inventive embodiments, the auxiliary heat engine could be applied to power the mechanical compression loads associated with operating the PSA or VPSA unit. In this voltage range, the main advantage of the inventive embodiments would be to improve power density of the SOFC stack.

The more compelling advantages of the invention are revealed at operating points 97 and 98, at 900 mV and 959 mV respectively where the SOFC cell voltage is near the maximum voltage for thermally self-sustaining operation of the SOFC. These operating points are impracticable for the rated design point of conventional SOFC's, whose power density would be far too low for economic viability. Preferably, the apparatus of the present invention will be operated at its normal design point near the thermally self-sustaining heat balance point. Preferably, the apparatus will be designed according to the art with highly insulating thermal enclosures to minimize heat leaks from high temperature components, and with high effectiveness recuperative heat exchangers for recovering heat from exhaust streams to preheat fuel and air feed streams. Preferably as well, the air blower 18 will be operated at the normal design point of the SOFC so as to maintain a relatively low flow volume of excess air (i.e. cathode stoichiometry in the range of about 2 to 2.5) so as to reduce air cooling of the stack at the normal design operating point relative to conventional SOFC plants, which often use a relatively large excess air flow to the cathode (stoichiometry of about 3.5 to 4) for cooling the stack which conventionally operates at relatively low cell voltage and thus generates much excess heat.

At operating point 97, with cell voltage of 900 mV, the embodiment of FIG. 1 would achieve an excellent efficiency of 70.7%, with power density 61.6% of conventional maximum. At operating point 97, with cell voltage of 900 mV, the embodiment of FIG. 1 would achieve an excellent efficiency of 70.7%, with power density 61.6% of conventional maximum. This efficiency corresponds to the range expected with a conventional gas turbine SOFC hybrid power plant of much higher power rating in the megawatt range (e.g. about 10 MW or more).

At operating point 98, with cell voltage of 900 mV, the inventive SOFC power plant of FIG. 1 would achieve an exceptional efficiency of 75%, with power density reduced to 46% of conventional maximum.

In comparison with conventional gas turbine SOFC hybrid design approaches, the present invention achieves superior efficiency at relatively smaller power ratings. The inventive power plant is relatively simple, as all electric power is generated by the SOFC unit without being hybridized with an entirely different engine power plant. The internal auxiliary mechanical loads of the present invention are preferably powered electrically by the SOFC, or alternatively by auxiliary heat engines powered by high grade SOFC heat.

Electrical powering of the auxiliary mechanical compression loads enables the SOFC to operate at extremely high efficiency, preferably in rated load steady state at or near the heat balance point where the SOFC generates just enough high grade heat to be self-sustaining, without exporting significant high grade heat. Apart from minor heat leakage through the insulated enclosure of the hot section of the SOFC plant, the low grade waste heat is rejected primarily as sensible heat of exhaust vitiated air, and of the carbon dioxide and water reaction products. This approach of discharging only low grade heat is advantageous in cogeneration applications (e.g. heating as well as powering buildings) where heat exported from the SOFC is only useful at relatively low temperature. It is very desirable for future vehicle traction and marine propulsion applications of inventive SOFC power plants, since waste heat is rejected only at low temperature by the exhaust fluids of the power plant and without a separate cooling radiator. Similarly, this approach will be useful for military peace-keeping forces as providing an extremely high efficiency power plant with absolutely minimal thermal signature.

Since the mechanical compression loads (blowers, vacuum pumps, and water pumps) and the rotary adsorber of preferred embodiments are powered with electrically powered and electronically controlled variable speed drives, a process according to the invention provides that the inventive SOFC power plant has a normal design operating point which may be closely approaching the thermally self-sustaining heat balance point, as represented by points 97 and 98 on curve 83.

The SOFC power plant is capable of responding to peak power demands, which may be expressed by increased current draw from the load or a corresponding dip in load voltage, or else may be commanded through the controller 60. To increase the SOFC delivered power, the operating point will be shifted for the duration of the peak power demand interval from points 97 or 98 (adjacent the thermally self-sustaining heat balance point) to a higher power operating point such as points 96 or 95, or even approaching the maximum point 99 of curve 83. Controller 60 substantially simultaneously accelerates the variable speed drive motors 21, 31, 35 and 51 to establish their speeds in approximate proportion to actual or desired current delivery from the SOFC stack, so as to maintain the anode fuel supply in proportion to current being delivered. Controller also substantially simultaneously accelerates the variable speed drive motor 19 to increase air flow more than proportionately to the actual or desired current delivery from the SOFC stack, so that the cathode stoichiometry is increased in order to provide enhanced stack cooling under peaking power conditions when SOFC voltage efficiency will be reduced at higher current density. The fractional increase in air flow (from the normal design operating point) should be in the range of about 1.5 to about 2.5 times the fractional increase in current (from the normal design operating point).

Thus, instantaneously measured SOFC current in bus 62 may be the primary control variable for substantially proportional speed regulation of the PSA unit 8 and associated motors 21, 31 and 35. The speed of motor 19 driving air blower 18 may be controlled by the sum of a suitably amplified signal from variations of instantaneous SOFC current and a feedback control signal from departures of actual SOFC stack temperature from the reference normal stack operating temperature, with SOFC stack temperature measured by a suitable thermal transducer adjacent the SOFC 2 or more desirably cathode exit port 17. SOFC stack working pressure may also be varied by regulation of fuel feed pressure.

The SOFC power plant is also capable of being turned down to an idle or standby mode producing a low SOFC current and power level. The PSA unit with associated motor drives 31, 35 and 31 may be slowed down to reduce hydrogen recirculation, or alternatively the PSA and vacuum pump may be turned off by stopping motors 21 and 35. Fuel values not recovered by the PSA in the idle or standby mode will be directed to burner 41, whose heat generation will assist the SOFC to maintain itself at working temperature. Burner 41 will similarly be applied to assist warming the SOFC system during startup. Air blower 18 and its motor 19 will be slowed, preferably more than proportionately to the reduction in SOFC stack current so as to establish a low stoichiometry in the cathode in the approximate range of about 1.1 to about 1.5 during SOFC power plant idle or standby mode, so as (1) to reduce air circulation through the SOFC and thus minimize convective stack cooling, and (2) increase heat generation in the stack by partial oxygen deprivation and consequently reduced voltage efficiency.

It will be evident that there may be many other alternatives and variations of the disclosed systems and processes within the disclosed scope of the present invention.

For SOFC power plants, the disclosed inventive systems and processes may enhance power generation performance by substantially increasing the ratio of hydrogen to steam partial pressure in the anode relative to the systems of the prior art. Estimated electrical generation efficiencies based on fuel lower heating value may be in the range of about 65% to about 75% for natural gas fuelled fuel cell power plants, while high power density may be achieved at or near the thermal balance point where the fuel cell stack is thermally self-sustaining. The invention also facilitates cogeneration of efficiently generated electrical power, purified hydrogen, and low-grade waste heat suitable for building heating or domestic hot water utilities.

The fuel cell power plant of the present invention is characterized by high efficiency, wide range load following and turndown capability, and the advantageous direct use of common hydrocarbon fuels such as natural gas, methanol and gasoline. It will be evident that these features can be of great importance for both mobile power plants (e.g highway, rail and marine propulsion power plants) as well as for stand-alone distributed stationary power generation. The attainment of efficiencies in the order of 70% from lower heating value of ordinary fuels can have a major impact on fossil fuel resource conservation as well as reduction of carbon dioxide emissions, when applied extensive to stationary power generation and transportation fleets.

Having illustrated and described the principles of the disclosure with reference to several embodiments, it will be apparent to those of ordinary skill in the art that the invention may be modified in arrangement and detail without departing from such principles.

I claim:

1. A method for operating an electrical current generation system comprising a high temperature fuel cell operating at a temperature of at least 250° C. including a cathode channel with air supply means delivering air to the cathode channel and an anode channel comprising an anode inlet and an anode outlet, whereby at least one hydrocarbon feedstock is subject to internal reforming in the anode channel to produce a hydrogen containing fuel gas, and a hydrogen recycle means configured to receive an anode exhaust gas comprising hydrogen from the anode outlet, and to enrich and recycle at least a portion of the hydrogen from the anode exhaust gas for supplying to the anode inlet, the method comprising:

controlling the hydrogen recycle means and the air supply means to operate the high temperature fuel cell in a substantially thermally balanced regime at a normal design operating point, the system generating only enough high grade heat at a normal design operating point to be self-sustaining while substantially all waste heat of the system is rejected at a relatively low temperature; and controlling the hydrogen recycle means and the air supply means to shift the operating point of the system for peak power demands or for turndown to low delivered power generation.

2. The method according to claim 1 wherein the hydrogen recycle means comprises a rotary VPSA gas separation system, configured to provide a recycle gas enriched in hydrogen relative to the anode exhaust gas for supplying to the anode inlet, comprising at least one vacuum pump powered by the high temperature fuel cell, a variable motor means such that the power of the vacuum pump may be varied, and a variable rotary motor means powered by the high temperature fuel cell, such that the rotational speed of the rotary VPSA may be varied, the method additionally comprising varying the power of the vacuum pump and the rotational speed of the rotary VPSA to control the volume of hydrogen-enriched recycle gas supplied to the high temperature fuel cell to maintain the operation of the high temperature fuel cell in a substantially temperature balanced regime.

3. The method according to claim 1 wherein the electrical current generation system has an efficiency of at least about 70% when electrochemical fuel utilization of the high temperature fuel cell is at least about 90%.

4. The method according to claim 1, shifting the operating point of the system in response to peak power demands by increasing the speed of the hydrogen recycling means so as to maintain the fuel cell anode fuel supply substantially in proportion to electrical current being delivered, while increasing the fuel cell cathode air flow more than proportionally to electrical current being delivered so as to provide enhanced stack cooling under peaking power conditions.

5. The method according to claim 4, in which the fractional increase of air flow from the normal design operating point is in the range of about 1.5 to about 2.5 times the fractional increase in current flow from the normal design operating point.

6. The method according to claim 4, controlling air flow in response to departures of fuel cell stack temperature from the normal stack operating temperature.

7. The method according to claim 4, controlling air flow in response to variations of electrical current being delivered.

8. The method according to claim 1, turning down the operating point of the system to an idle or standby mode to produce relatively low electrical current and power, by reducing the fuel cell anode fuel supply and the fuel cell cathode air flow, while slowing down the hydrogen recycling means.

9. The method according to claim 8, burning excess anode exhaust fuel not recovered by the hydrogen recycling means so as to assist the system to remain at working temperature in the idle or standby mode.

10. The method according to claim 8, further stopping the hydrogen recycling means and burning the anode exhaust gas to assist the system to remain at working temperature in the idle or standby mode.

11. The method according to claim 8, slowing down the cathode air flow more than proportionally to the reduction of electrical current delivered, so as to reduce convective cooling of the fuel cell stack by air circulation through the system, while also increasing heat generation in the stack by partial oxygen deprivation and consequently reduced voltage efficiency.

12. The method according to claim 11, slowing down the cathode air flow so as to establish a low cathode stoichiometry in the range of about 1.1 to about 1.5.

13. The method of claim 1 in which substantially no high grade heat is delivered so as to have a minimum thermal signature.

14. The method of claim 1, operating the fuel cell at a cell voltage in the range of about 800 to about 950 millivolts.

15. The method of claim 14, operating the fuel cell at a cell voltage in the range of about 900 to about 950 millivolts.

16. A method for operating an electrical current generation system, comprising:

providing a high temperature fuel cell that operates at a temperature of at least 250° C., the fuel cell including a cathode channel with an air supply delivering air to the cathode channel and an anode channel comprising an anode inlet and an anode outlet, whereby at least one hydrocarbon feedstock is internally reformed in the anode channel to produce a hydrogen containing fuel gas, and a hydrogen recycler that receives an anode exhaust gas comprising hydrogen from the anode outlet to enrich and recycle at least a portion of the hydrogen from the anode exhaust gas for supply to the anode inlet;

controlling the hydrogen recycler and the air supply to operate the high temperature fuel cell in a substantially thermally balanced regime at a normal design operating point, the system generating only enough high grade heat at a normal design operating point to be self-sustaining while substantially all waste heat of the system is rejected at a relatively low temperature; and controlling the hydrogen recycler and the air supply to shift the operating point of the system for peak power demands or for turndown to low delivered power generation.

17. The method according to claim 16 wherein the hydrogen recycler comprises a rotary VPSA gas separation system that provides a recycle gas enriched in hydrogen relative to the anode exhaust gas for supply to the anode inlet, the system comprising at least one vacuum pump powered by the high temperature fuel cell and having a variable motor such that the power of the vacuum pump may be varied, and a variable rotary motor powered by the high temperature fuel cell, such that the rotational speed of the rotary VPSA may be varied, the method additionally comprising varying vacuum pump power and rotary VPSA rotational speed to control volume of hydrogen-enriched recycle gas supplied to the high temperature fuel cell to maintain the high temperature fuel cell operating in a substantially temperature balanced regime.

18. The method according to claim 16 wherein the electrical current generation system has an efficiency of at least about 70% when electrochemical fuel utilization of the high temperature fuel cell is at least about 90%.

* * * * *